United States Patent [19]

Watanabe

[11] Patent Number: 5,764,611
[45] Date of Patent: Jun. 9, 1998

[54] INFORMATION REPRODUCING APPARATUS HAVING FUNCTION OF DETECTING INCLINATION OF MANUAL SCAN TYPE HANDY READING DEVICE AND CORRECTING ADVERSE EFFECTS ARISING FROM THE INCLINATION

[75] Inventor: Hiroyuki Watanabe, Yokohama, Japan

[73] Assignee: Olympus Optical Co., Ltd., Tokyo, Japan

[21] Appl. No.: 386,073

[22] Filed: Feb. 9, 1995

[30] Foreign Application Priority Data

Feb. 16, 1994 [JP] Japan ................... 6-019468

[51] Int. Cl.$^6$ ................................................ G11B 7/00
[52] U.S. Cl. ................. 369/59; 369/47; 369/48; 369/58
[58] Field of Search ................... 369/53, 54, 58, 369/59, 42, 48, 44.32, 44.28, 84

[56] References Cited

U.S. PATENT DOCUMENTS

| | | | |
|---|---|---|---|
| 5,130,963 | 7/1992 | Kusano et al. | 369/44.32 X |
| 5,323,367 | 6/1994 | Tamura et al. | 369/58 X |
| 5,402,406 | 3/1995 | Fuma et al. | 369/84 |
| 5,430,699 | 7/1995 | Matsubara et al. | 369/44.32 |

FOREIGN PATENT DOCUMENTS

WO 94/08314   4/1994   WIPO.

*Primary Examiner*—Muhammad N. Edun
*Attorney, Agent, or Firm*—Frishauf, Holtz, Goodman, Langer & Chick, P.C.

[57] ABSTRACT

To accurately reproduce multimedia information even if a pen type reading device for manually reading the multimedia information recorded to be capable of being optically read is not scanned perpendicularly to a sheet but is scanned at an inclination angle with respect thereto, a CCD arranged in the pen type reading device picks up a dot code from the sheet having a portion in which the multimedia information is recorded as a dot code capable of being optically read. A field memory stores the picked dot code as image data. A demodulating circuit demodulates the image data stored in the field memory. A subsequent signal processing circuit performs predetermined processing of the demodulated image data and outputs the resultant data as the original multimedia information. In this case, an inclination sensor arranged at the rear end of the pen type reading device detects an inclined state of the pen type reading device with respect to the sheet. A CPU, a coordinate conversion circuit, and an address/coefficient generation circuit determine a read address of the image data from the field memory in accordance with the inclined state of the pen type reading device with respect to the detected sheet.

17 Claims, 18 Drawing Sheets

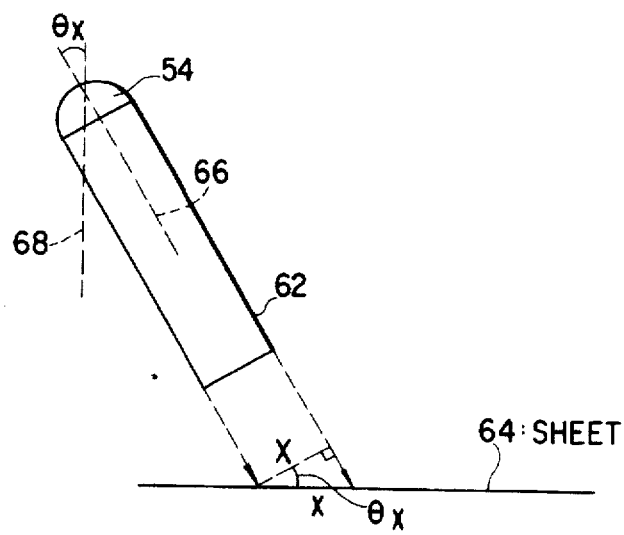
F I G. 3A
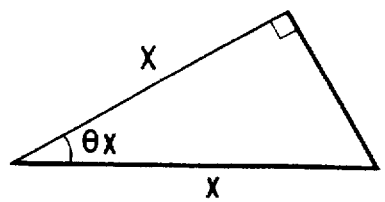
F I G. 3B
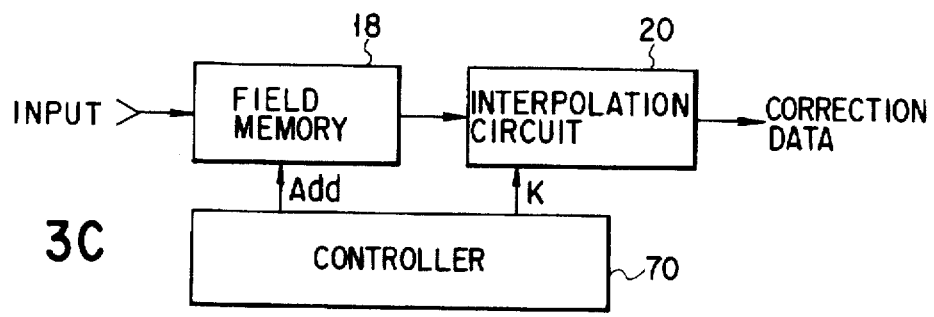
F I G. 3C
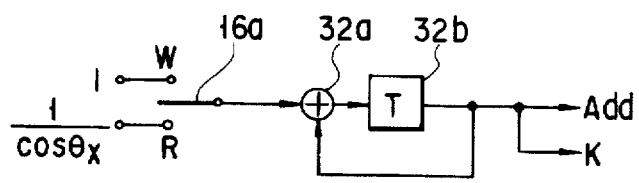
F I G. 3D $x_0 = 16$ $\sqrt{\dfrac{x_1}{x_0}} = 1.27$ $x_1 = 26$

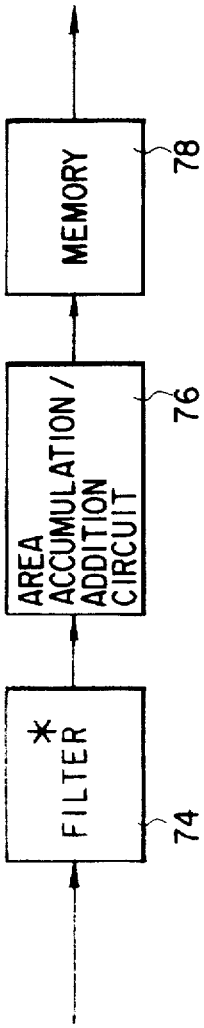
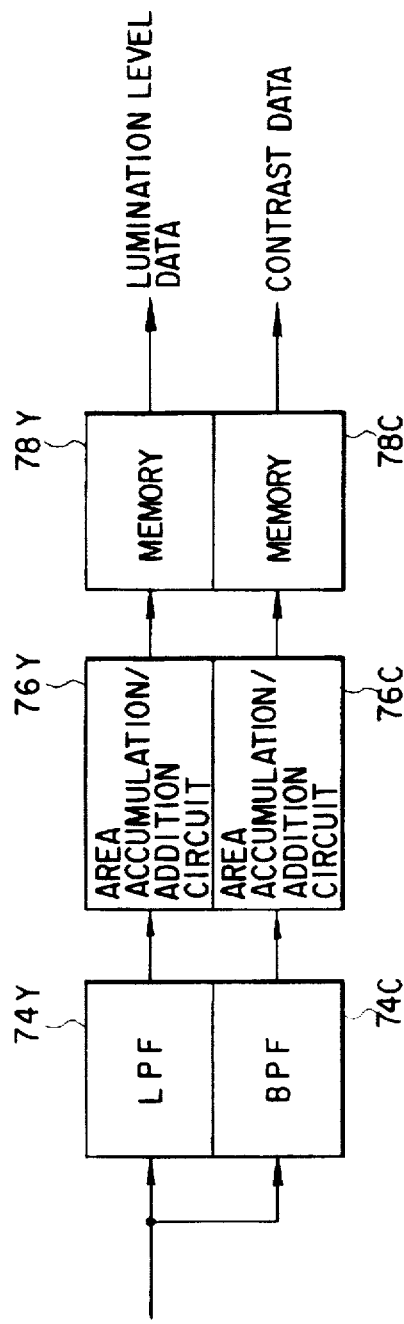
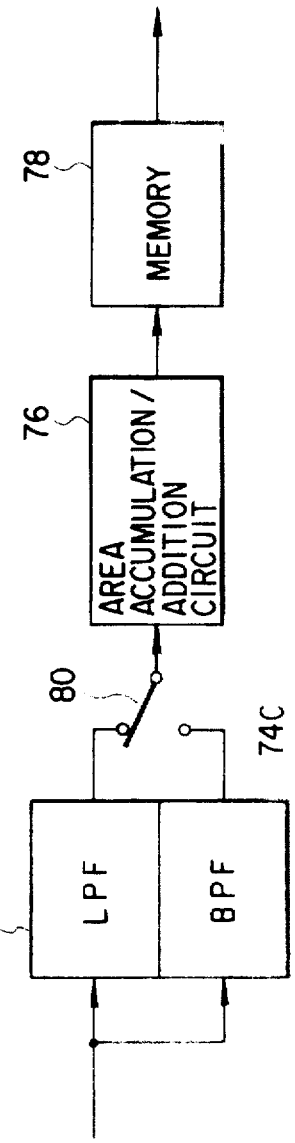
F I G. 6A    F I G. 6B    F I G. 6C

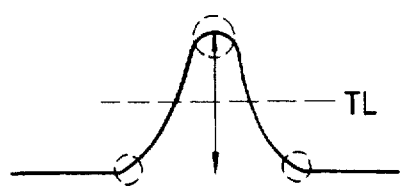
F I G. 9A
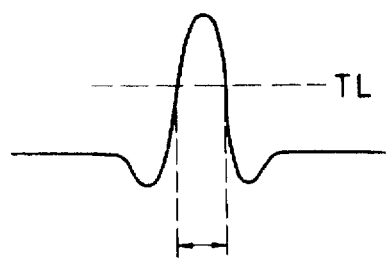
F I G. 9B
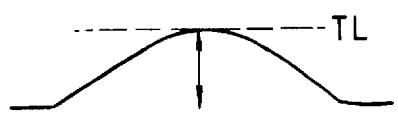
F I G. 9C
F I G. 9D
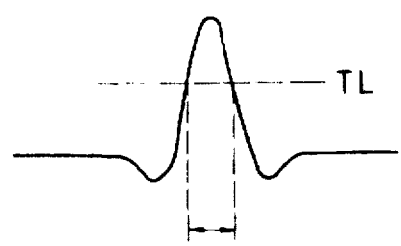
F I G. 9E $(a + b + c + d)k + X(1-4k)$

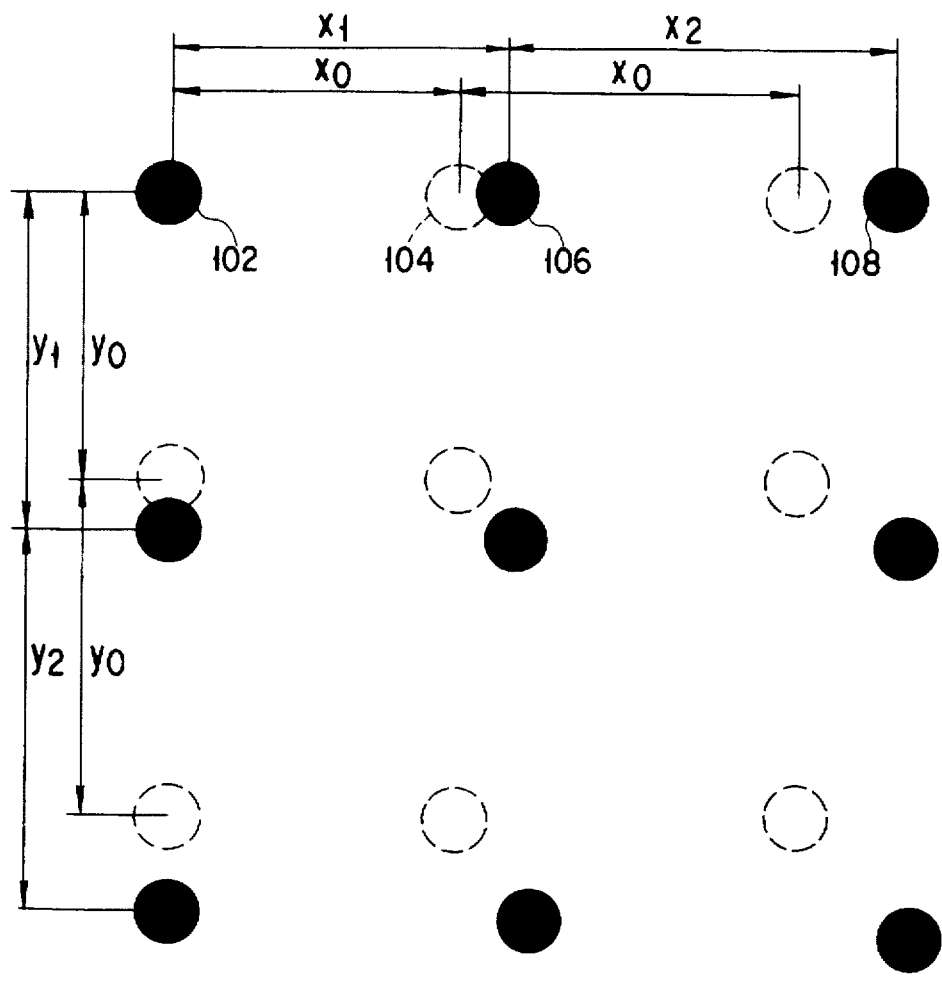
$$\text{MAGNIFICATION} = \frac{x_n}{x_{n-1}}$$
$$\frac{y_n}{y_{n-1}}$$
F I G. 11

FIG. 12A
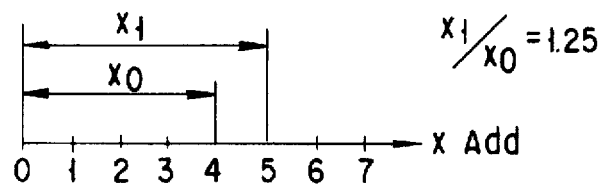
FIG. 12B
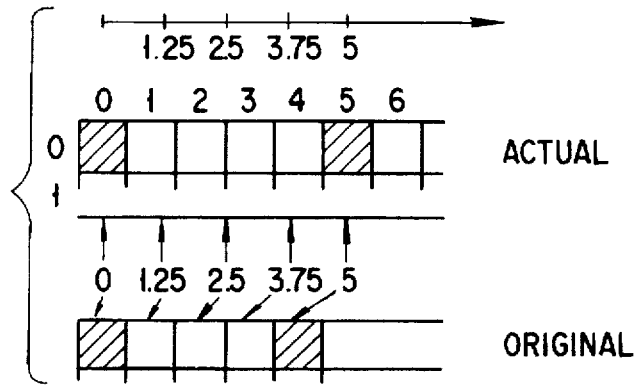
FIG. 12C
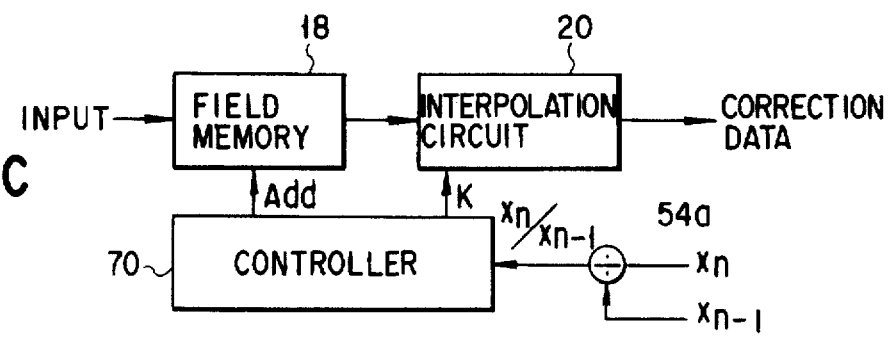
FIG. 12D
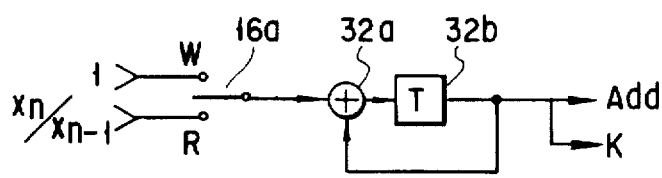
| | WRITE = 0 | | | | | | | | READ = 1.25 | | | | |
|---|---|---|---|---|---|---|---|---|---|---|---|---|---|
| RESULT | 0 | 1 | 2 | 3 | 4 | 5 | 6 | | 0 | 1.25 | 2.5 | 3.75 | 5 |
| Add | 0 | 1 | 2 | 3 | 4 | 5 | 6 | | 0 | 1 | 2 | 3 | 5 |
| K | 0 | 0 | 0 | 0 | 0 | 0 | 0 | | 0 | 0.25 | 0.5 | 0.75 | 0 |
FIG. 12E

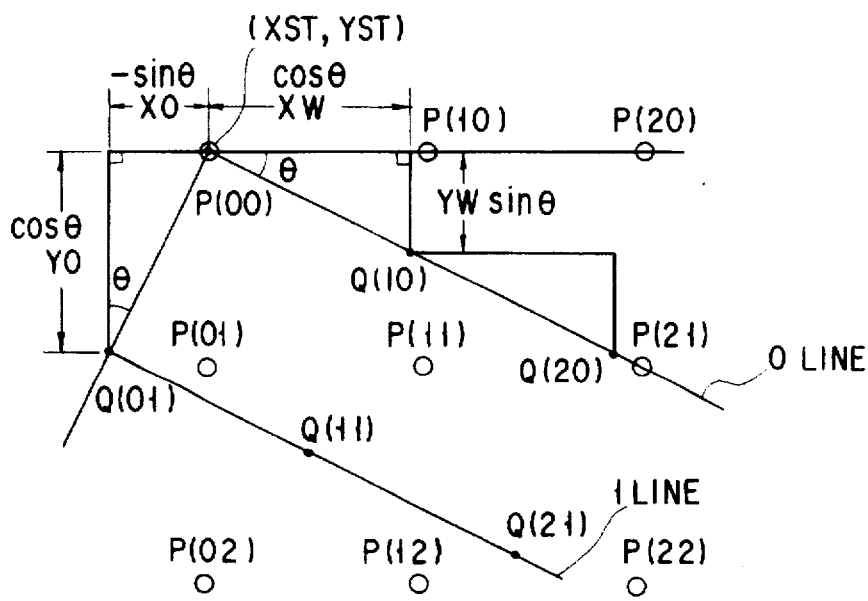
ACTUAL PIXEL STORED IN MEMORY (O)
DISTANCES IN X AND Y DIRECTIONS
VIRTUAL PIXEL TO BE READ FROM MEMORY (•)
(EXAMPLE)   Q(10)    x --- P(00) + cos θ
                     y --- P(00) + sin θ
             Q(20)    x --- P(00) + 2cos θ = P(10) + 2 cos θ - 1
                      y --- P(00) + 2sin θ = P(10) + 2 sin θ
             Q(01)    x --- P(00) - sin θ
                      y --- P(00) + cos θ
             Q(11)    x --- P(00) - sin θ + cos θ = P(01) - sin θ + cos θ
                      y --- P(00) + cos θ + sin θ = P(01) + cos θ + sin θ - 1
F I G. 13

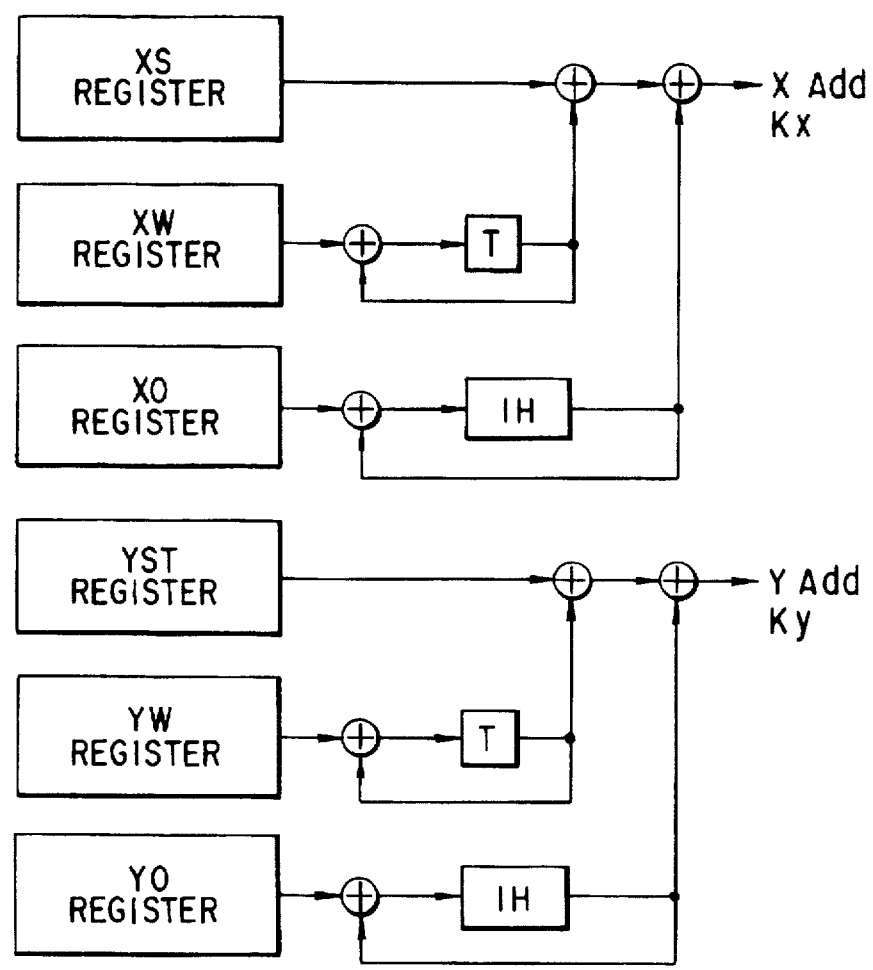
F I G. 14

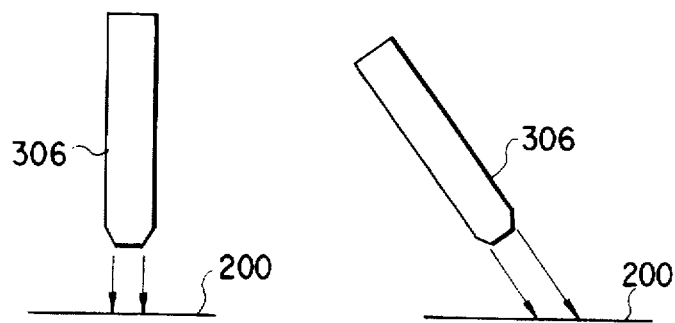
FIG. 18A (PRIOR ART)
FIG. 18B (PRIOR ART)
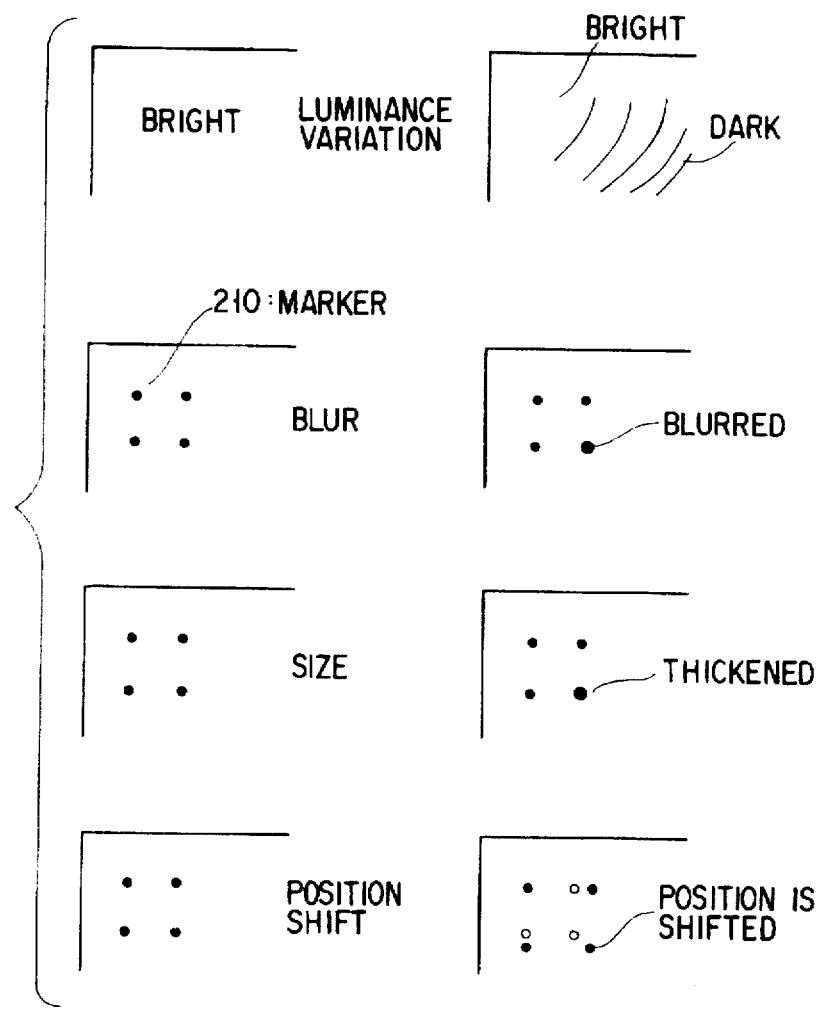
FIG. 18C (PRIOR ART)

INFORMATION REPRODUCING APPARATUS HAVING FUNCTION OF DETECTING INCLINATION OF MANUAL SCAN TYPE HANDY READING DEVICE AND CORRECTING ADVERSE EFFECTS ARISING FROM THE INCLINATION

BACKGROUND OF THE INVENTION

1. Field of the Invention

The present invention relates to an information reproducing apparatus for converting so-called multimedia information including, e.g., audio information such as speech and music information, video information obtained by a camera, a video equipment, and the like, and digital code data obtained from a personal computer, a wordprocessor,; and the like into a code which can be optically read, and reading a dot code recorded on paper, various types of resin films, metal sheets and, more particularly, to an information reproducing apparatus in which, when a handy, particularly, pen type reading device for manual scanning is used, the influence of inclination of the pen type reading device with respect to a sheet is removed.

2. Description of the Related Art

As media for recording speech information, music information, and the like, a magnetic tape, an optical disk, and the like are known. Even if, however, copies of these media are produced in large quantities, the unit cost of production is relatively high, and storage of such copies requires a large space. In addition, when a medium on which speech information is recorded needs to be transferred to a person in a remote place, it takes much labor and time to mail or directly take the medium to the person. So-called multimedia information other than the audio information, which includes image information obtained from a camera or video equipment, and digital code data obtained from a personal computer or wordprocessor have the same problems.

International Application PCT/JP93/01377 (WO 94/08314) assigned to the same assignee as for the present invention discloses a system in which multimedia information including at least one of audio information, image information, and digital code data is recorded on paper, various types of resin films, or a metal sheet, as image information, i.e., a dot code which can be transferred by a facsimile apparatus and copied in large quantities, and a system for reproducing this information.

According to this prior art, dot codes which are recorded as image information and can be optically read are recorded on a sheet 200 in a format as shown in FIG. 16. More specifically, digitized sound or picture data is printed as dot codes 206 together with an image 202 and a character 204. The dot code 206 is constituted by a plurality of blocks 208 which are two-dimensionally arranged. Each block 208 consists of markers 210, x address data 212 of the block, y address data 214, error detection/correction data 216 of the address, and a data area 218 for recording actual data. The blocks 208 are separated from each other at their four corners by the markers 210. The dot size of the data is different from that of the marker 210 so that they can be discriminated from each other. Actually, the data and the marker 210 can be sufficiently discriminated by five- or ten-time difference in size. In the dot code 206, therefore, when the position of the marker 210 is detected, the position of the data can be detected.

The apparatus for reproducing the dot code 206 has an arrangement as shown in FIGS. 17A and 17B. More specifically, this information reproducing apparatus comprises a detection section 218 for reading the dot code from the sheet 200 on which the dot code 206 is printed, a scan conversion section 220 for recognizing image data supplied from the detection section 218 as a dot code and normalizing the image data, a binarization processing section 222 for binarizing multi-value data, a demodulating section 224, an adjusting section 226 for adjusting a data array, a data error correction section 228 for correcting a reading error and a data error in reproduction, a data separation section 230 for separating the data in accordance with the their attributes, an expansion processing section for performing processing corresponding to data compression processing according to the attribute of the data, a display section or reproducing section, and other output devices.

Of these sections, at least the detection section 218, more preferably all the sections except for the output devices (a CRT (Cathode-Ray Tube), an FMD (Face-Mounted Display), a loudspeaker, a headphone, a printer, a plotter, and the like) are constituted as a pen type reading device as a handy device which is held by a hand to scan the dot code 206 on the sheet.

In the detection section 218, the dot code 206 on the sheet 200 is illuminated by a light source 232. The reflected light is detected as an image signal by an image pickup section 238 such as a charge-coupled device (CCD) or charge-modulated device (CMD) for converting optical information into an electrical signal through an image formation optical system 234 such as a lens and a spatial filter 236 for removing a moire and the like. The image signal is amplified by a preamplifier 240 and output. The light source 232, the image formation optical system 234, the spatial filter 236, the image pickup section 238, and the preamplifier 240 are arranged in an external light shielding section 242 for preventing a disturbance against the external light. The image signal amplified by the preamplifier 240 is converted into digital information by an A/D (Analog/Digital) conversion section 244 and supplied to the scan conversion section 220 on the subsequent stage.

The image pickup section 238 is controlled by an image pickup section control section 246. When a CCD of an interline transfer system is used as the image pickup section 238, the image pickup section control section 246 outputs, as a control signal for the image pickup section 238, a vertical blanking signal for vertical synchronization, an image pickup element reset pulse signal for resetting information charges, a charge transfer gate pulse signal for sending charges accumulated in a two-dimensionally arranged charge transfer accumulation section to a plurality of vertical shift registers, a vertical charge transfer CLK signal serving as a transfer clock signal of a horizontal shift register for transferring the charges in the horizontal direction and externally outputting the charges, or a vertical charge transfer pulse signal for transferring the charges in the plurality of vertical shift registers in the vertical direction and sending the charges to the horizontal shift register. The image pickup section control section 246 also applies a light emission cell control pulse for setting the timing of light emission of the light source 232 such that the light source 232 is turned on during vertical blanking in accordance with the timing of light emission.

The scan conversion section 220 is a section for recognizing image data supplied from the detection section 218 as a dot code, and normalizing it. As a technique for this operation, the image data from the detection section 218 is stored in an image memory 248, read out therefrom temporarily, and supplied to a marker detection section 250.

The marker detection section 250 detects a marker of each block. A data array direction detection section 252 detects the rotation or inclination and the array direction of the data by using the markers. An address control section 254 reads out image data from the image memory 248 and supplies the data to an interpolation circuit 256 so as to correct it in accordance with the detection result. At this time, lens aberration information is read out from a memory 258 for correcting the distortion of the aberration of the lens of the image formation optical system 234 of the detection section 218, thereby performing lens correction as well. The interpolation circuit 256 performs interpolation processing of the image data to convert it into an original pattern, i.e., a dot code.

An output from the interpolation circuit 256 is supplied to the binarization processing section 222. As is apparent from FIG. 16 as well, the dot code 206 is basically a black and white pattern, i.e., binary information. Therefore, the data is converted into binary data by the binarization processing section 222. At this time, binarization is adaptively performed while threshold determination is performed by a threshold determination circuit 260 in consideration of the influences of disturbance, signal amplitude, and the like.

Since predetermined modulation has been performed by a recording system (not shown) during recording the dot code on the sheet 200, the demodulating section 224 demodulates the data, and inputs the resultant data to the data array adjusting section 226.

In the data array adjusting section 226, the block addresses of the above two-dimensional blocks are detected by a block address detection section 262 first, and error detection and correction of the block addresses are then performed by a block address error detection/correction section 264. Thereafter, an address control section 266 stores the resultant data in a data memory section 268 in units of blocks. By storing the data in units of block addresses in this manner, the data can be efficiently stored even if an intermediate data portion is omitted or data is inserted in the process of storing the data.

After this operation, error correction of the data read out from the data memory section 268 is performed by the data error correction section 228. An output from the data error correction section 228 is branched to two ways. One output is supplied, as digital data, to a personal computer, a wordprocessor, an electronic notebook, or the like, through an interface (I/F) 270. The other output is supplied to the data separation section 230 to be separated into image data, handwritten character or graph data, character or line drawing data, and sound data (including two types, i.e., sound data without any processing and data having undergone speech synthesis).

Image data corresponds to natural image data, which is multi-value image data. An expansion processing section 272 performs expansion processing of this data, which corresponds to JPEG (Joint Photographic Coding Experts Group) in data compression. In a data interpolation circuit 274, data for which error correction cannot be performed is interpolated.

For binary image information as of a handwritten character or a graph, an expansion processing section 276 performs expansion processing corresponding to MR (Modified READ)/MH (Modified Huffman)/MMR (Modified Modified READ) in data compression. In a data interpolation circuit 278, data for which error correction cannot be performed is interpolated.

Character or line drawing data is converted into a different pattern for display by a PDL (Page-Description Language) processing section 280. Note that even line drawing or character information which has been coded and undergone compression processing for a code is subjected to corresponding expansion (Huffman coding, Lempel-Ziv, or the like) processing in an expansion processing section 282, and is supplied to the PDL processing section 280.

Outputs from the data interpolation circuits 274 and 278 and the PDL processing section 280 are synthesized or selected by a synthesizing/switching circuit 284. The resultant data is converted into an analog signal by a D/A (Digital/Analog) conversion section 286. Thereafter, the corresponding information is displayed on a display section 288 such as a CRT (TV monitor) or an FMD. Note that the FMD is a glasses-type monitor (handy monitor) to be mounted on the face of the user, and can be effectively used for, e.g., a virtual reality operation or looking at an image on a large frame in a narrow place.

Speech information is subjected to expansion processing in an expansion processing section 290, which corresponds to ADPCM (Adaptive Differential Pulse Code Modulation). Furthermore, in a data interpolation circuit 292, data for which error correction cannot be performed is interpolated. In performing speech synthesis, a speech synthesis section 294 receives a code for speech synthesis, actually synthesizes speech from the code, and outputs it. In this case, if the code itself is compressed, speech synthesis is performed after expansion processing such as Huffman coding or Lempel-Ziv processing is performed in an expansion processing section 296, as in the case of the above character or line drawing information.

Outputs from the data interpolation circuit 292 and the speech synthesis section 294 are synthesized or selected by a synthesizing/switching circuit 298. The resultant data is then converted into an analog signal by a D/A conversion section 300. The signal is output to a loudspeaker, a headphone, or a speech output device 302 equivalent thereto.

Character or line drawing information is directly output from the data separation section 230 to a page printer or plotter 304. As a result, the character information can be printed, as wordprocessor characters, on a paper sheet, or the line drawing information can be output, as a drawing, from a plotter.

As is apparent, image information can also be printed by a video printer as well as being displayed on a CRT or an FMD, or the image can be photographed.

As described above, in International Application PCT/93/01377 (WO 94/08314), a digital video signal from the detection section 218 is temporarily stored in the image memory 248. Thereafter, markers are detected from the image in the image memory 248, and the marker array direction is detected. With this operation, it is detected whether the pen type reading device scans while inclined, i.e., rotated with respect to the marker array direction. If scanning is performed in an inclined state, the shift, i.e., inclined amount is detected to cause the address control circuit 254 to generate an address for straightly reading the image which is read in an inclined state, the image is read out from the image memory 248, and the data is transferred to the next signal processing circuit system. For this reason, even when the pen type reading device is scanned in an inclined state, the multimedia information can be properly reproduced.

However, this method is preferably applied when the pen type reading device is set to be vertical or substantially vertical with respect to the sheet 200, i.e., when the sheet 200 is almost vertically scanned. If the pen type reading device is not set to be vertical or substantially vertical with respect to the sheet 200 while the sheet 200 is scanned in an inclined state with a certain angle, the multimedia information may not be properly reproduced in some cases.

FIG. 18A shows a state in which a pen type reading device 306 is set to be vertical with respect to the sheet 200. To the contrary, when the pen type reading device 306 is set to be inclined with respect to the sheet 200, as shown in FIG. 18B, disadvantages as shown in FIG. 18C are generated. Referring to FIG. 18C, image pickup results in the image pickup section 238, which are obtained when the pen type reading device 306 is set in a state shown in FIG. 18A, are illustrated on the left side, and those obtained when the pen type reading device 306 is set in a state shown in FIG. 18B are illustrated on the right side.

First, the distance between the plurality of light sources 232 provided at the distal end of the pen type reading device 306 and the sheet 200 is not uniform. For this reason, a distant portion becomes dark to cause luminance variations. Second, as for the above-described markers 210 as large dots for positioning, when the pen type reading device 306 is set to be inclined with respect to the sheet 200, an in-focus position is shifted. For this reason, the marker 210 on the shifted side is blurred. Third, as the distance becomes larger, the dot size of the marker 210 itself becomes larger. Fourth, although the dots of the markers 210 must be regularly arrayed at predetermined positions to form a square, the dots are undesirably shifted from the original positions as the distance to the dot becomes larger and photographed.

As described above, if the markers are partially darkened or blurred, the dot size is changed, or the position of the dot is shifted, the markers 210 cannot be properly detected by the processing of the subsequent signal processing section, or accurate data cannot be reproduced.

SUMMARY OF THE INVENTION

The present invention has been made in consideration of the above situations and has as its object to provide an information reproducing apparatus capable of accurately detecting the inclination of a reading device for manually scanning and reading multimedia information including audio information, video information, digital code data, and the like, even if reading device is not set to be perpendicular or substantially perpendicular to a sheet on which the multimedia information is recorded as a code capable of being optically read, and scanned at an inclination angle with respect thereto, the code can be read and the multimedia information can be reproduced.

In order to achieve the above object, an information reproducing apparatus according to the present invention comprises reading means for optically reading a code from a recording medium in which multimedia information including at least one of audio information, video information, and digital code data is recorded as the code capable of being optically read, restoring means for restoring the code read by the reading means into the multimedia information, output means for outputting the multimedia information restored by the restoring means, and inclination detecting means for detecting an inclined state of the reading means with respect to the recording medium.

An information reproducing apparatus according to the present invention comprises reading means for optically reading a code from a recording medium in which multimedia information including at least one of audio information, video information, and digital code data is recorded as the code capable of being optically read, restoring means for restoring the code read by the reading means into the multimedia information, and output means for outputting the multimedia information restored by the restoring means, wherein the code has a plurality of blocks each having a plurality of data patterns arranged in accordance with contents of the information and markers arranged in a predetermined positional relationship with the data patterns, the restoring means comprises memory means for storing a code read by the reading means and memory control means for controlling read access of the code from the memory means, the memory control means controlling to read out the code using a normal address in a first sequence and read out the code using an address changed by coordinate conversion in a second sequence.

According to the information reproducing apparatus of the present invention, the reading means optically reads a dot code from a recording medium having a portion in which multimedia information including at least one of audio information, video information, and digital code data is recorded as the code capable of being optically read, the restoring means converts the read code into the multimedia information, and the output means outputs the restored multimedia information. At this time, the inclination detecting means detects an inclined state of the reading means with respect to the recording medium. The inclined state detected by the inclination detecting means can be used for inclination correction for removing the influence of the inclination of the reading means as needed.

In addition, according to the information reproducing apparatus of the present invention, a code from which multimedia information including at least one of audio information, video information, and digital code data to be recorded in a recording medium can be optically read has a plurality of blocks each having a plurality of data patterns arranged in accordance with contents of the information and markers arranged in a predetermined positional relationship with the data patterns, the restoring means comprises memory means for storing a code read by the reading means and memory control means for controlling read access of the code from the memory means. The memory control means controls to read out the code using a normal address in a first sequence and read out the code using an address changed by coordinate conversion in a second sequence. When the two sequences are simultaneously performed, the circuit scale becomes large. However, with the above arrangement, a circuit can be commonly used by shifting the timings of the sequences, thereby reducing the circuit scale.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is a view showing a loaded state of the inclination sensor in a pen type reading device;

FIG. 3B is a view showing the relationship between the inclination of the pen type reading device and an image distorted due to the inclination;

FIG. 3C is a circuit diagram showing the arrangement of a circuit for performing inclination correction using the output from the inclination sensor;

FIG. 3D is a circuit diagram showing an accumulation/addition circuit constituting a controller in FIG. 3C;

FIGS. 5A to 5C are graphs for explaining a method of detecting average luminance data, in which FIG. 5A shows a photographed signal, FIG. 5B shows a signal obtained by causing the signal in FIG. 5A to pass through a low-pass filter, and FIG. 5C shows average luminance level data obtained by calculating the sum value of the signal in FIG. 5B in each area;

FIGS. 6A to 6C are circuit diagrams showing a luminance level detection circuit and a contrast detection circuit in FIG. 1;

FIGS. 7A to 7E are graphs for explaining a method of determining the threshold level for binarization by a binarization circuit in FIG. 1, in which FIG. 7A shows an original signal to be supplied to the binarization circuit, FIG. 7B shows accumulation/addition data of the signal in FIG. 7A, FIG. 7C shows a signal obtained by causing the data in FIG. 7B to pass through the low-pass filter, FIG. 7D shows a signal obtained by multiplying the signal in FIG. 7C by a fixed coefficient, and FIG. 7E shows a binary signal obtained by binarizing the signal in FIG. 7A using the signal in FIG. 7D as a threshold level for binarization;

FIGS. 8A to 8C are graphs for explaining a method of detecting the blur of an image, in which FIG. 8A shows an original signal, FIG. 8B shows a signal obtained by causing the signal in FIG. 8A to pass through a bandpass filter, and FIG. 8C shows a signal obtained by accumulating/adding the signal in FIG. 8B of each area;

FIGS. 9A to 9E are views for explaining the operation of a coefficient generation circuit for generating the coefficient of a high-frequency emphasis circuit in FIG. 1, in which FIG. 9A shows an original signal, FIG. 9B shows a signal obtained upon high-frequency emphasis of the signal in FIG. 9A, FIG. 9C shows an original waveform obtained when the pen type reading device is inclined, FIG. 9D shows a signal obtained upon high-frequency emphasis of the signal in FIG. 9C, and FIG. 9E shows a signal obtained upon high-frequency emphasis of the signal in FIG. 9C using the coefficient generated by the coefficient generation circuit in accordance with blur amount information;

FIG. 11 is an enlarged view showing pixels shifted due to the inclination of the pen type reading device;

FIGS. 12A to 12E are views for explaining magnification correction, in which FIG. 12A is a view for explaining the magnification, FIG. 12B is a view showing the relationship between the position of a pixel actually written in a field memory and the original position of the pixel, FIG. 12C is a circuit diagram showing the circuit arrangement for magnification correction, FIG. 12D is a circuit diagram showing an accumulation/addition circuit constituting a controller in FIG. 12C, and FIG. 12E is a view showing outputs in the write and read modes of the accumulation/addition circuit in FIG. 12D;

FIG. 13 is a view for explaining rotation and a method of correcting it;

FIG. 14 is a circuit diagram showing the arrangement of a coordinate conversion circuit operated for rotation correction;

FIG. 18A is a view showing a state in which a pen type reading device is set to be vertical with respect to a sheet;

FIG. 18B is a view showing a state in which the pen type reading device is set to be inclined with respect to the sheet; and FIG. 18C is a view showing image pickup results obtained in the states in FIGS. 18A and 18B in correspondence with each other.

DETAILED DESCRIPTION OF THE PREFERRED EMBODIMENTS

Figure 16:
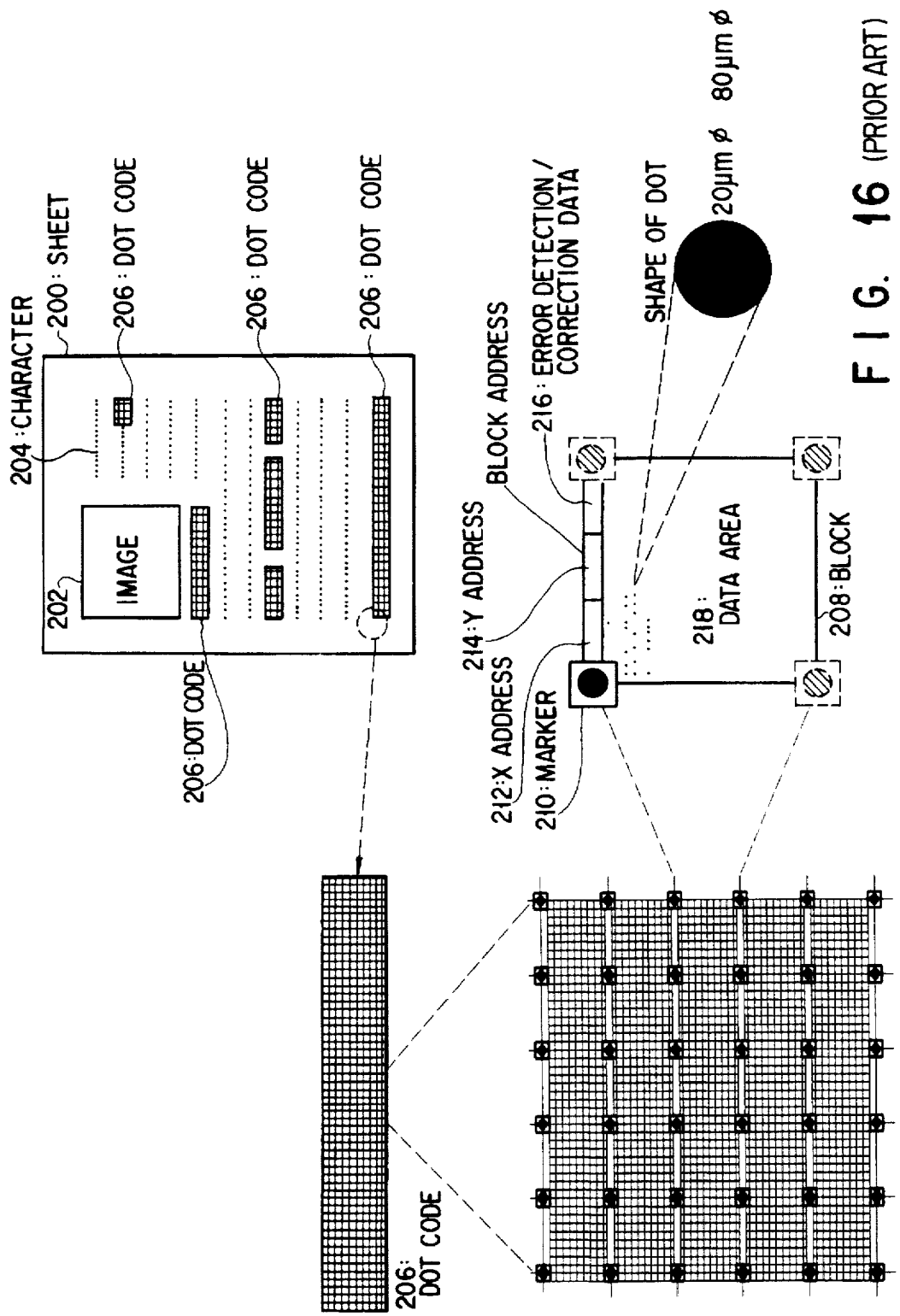
FIG. 16 is a view showing the recording format of a dot code.

An embodiment of the present invention will be described below with reference to the accompanying drawings. An information reproducing apparatus of this embodiment reproduces the dot code 206 as shown in FIG. 16, which can be optically read.

Figure 1:
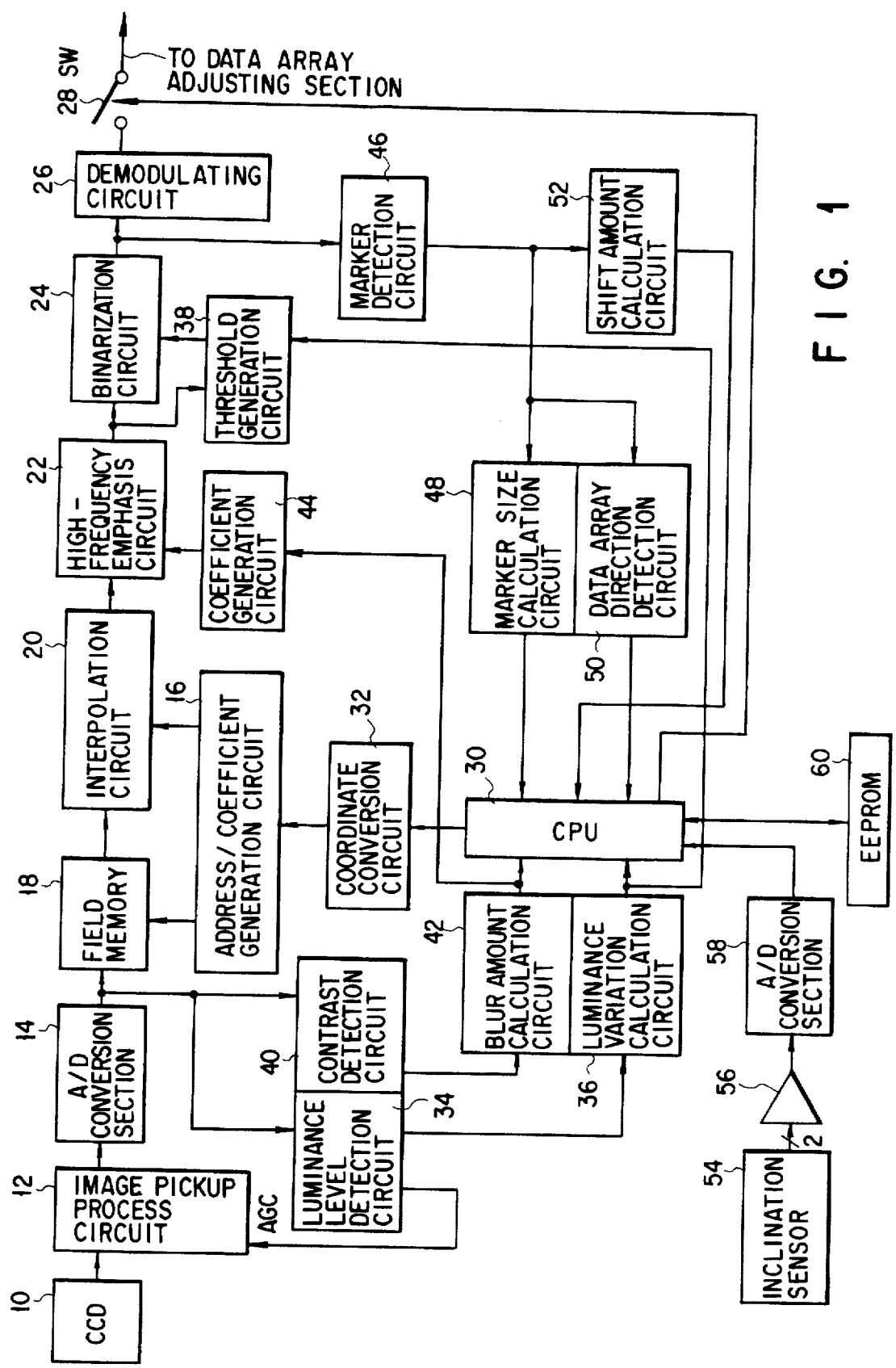
FIG. 1 is a block diagram showing the characteristic feature of an information reproducing apparatus according to an embodiment.
Figure 17A:
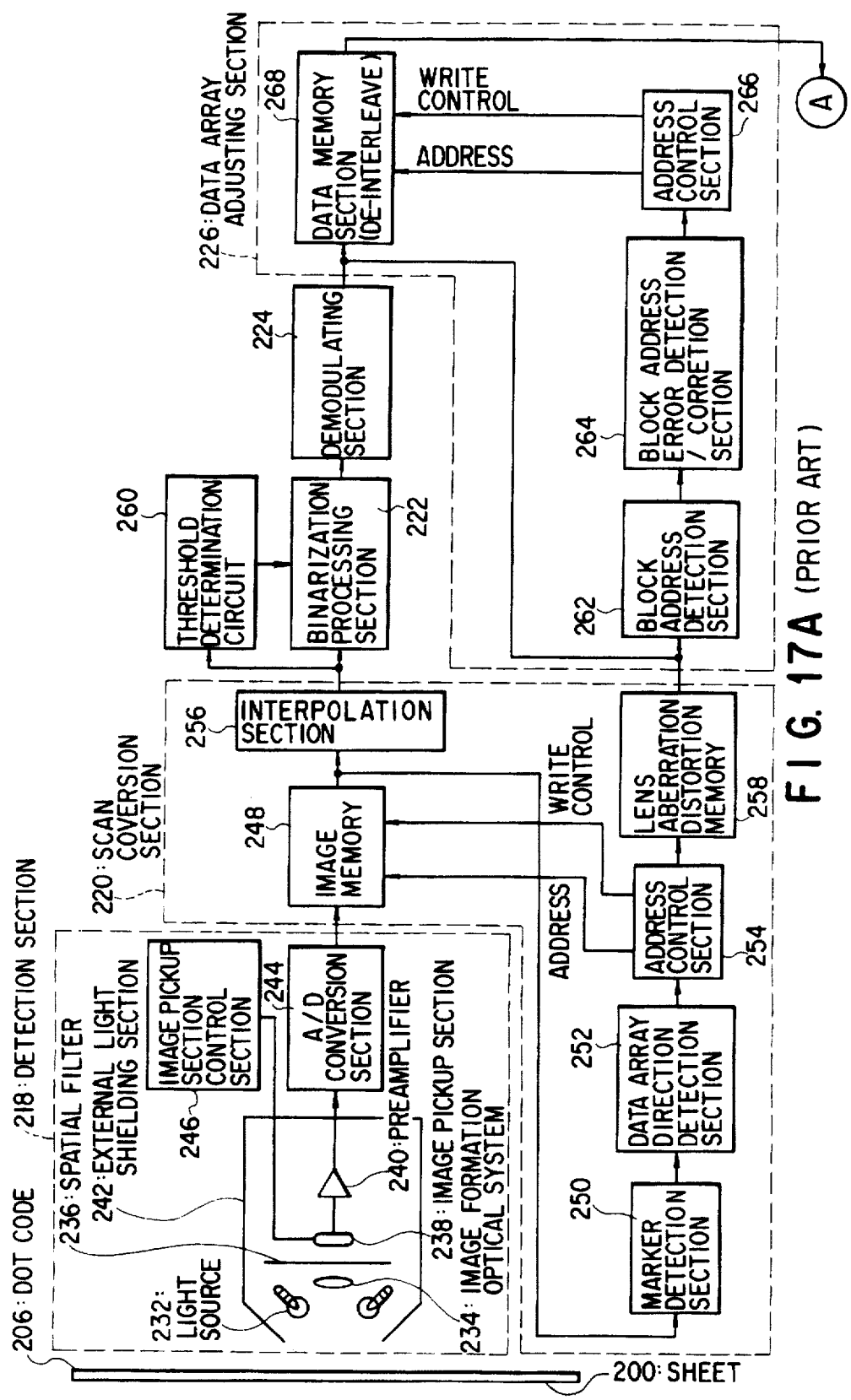
FIGS. 17A and 17B are block diagrams showing the arrangement of a conventional information reproducing apparatus for reproducing the dot code.
Figure 17B:
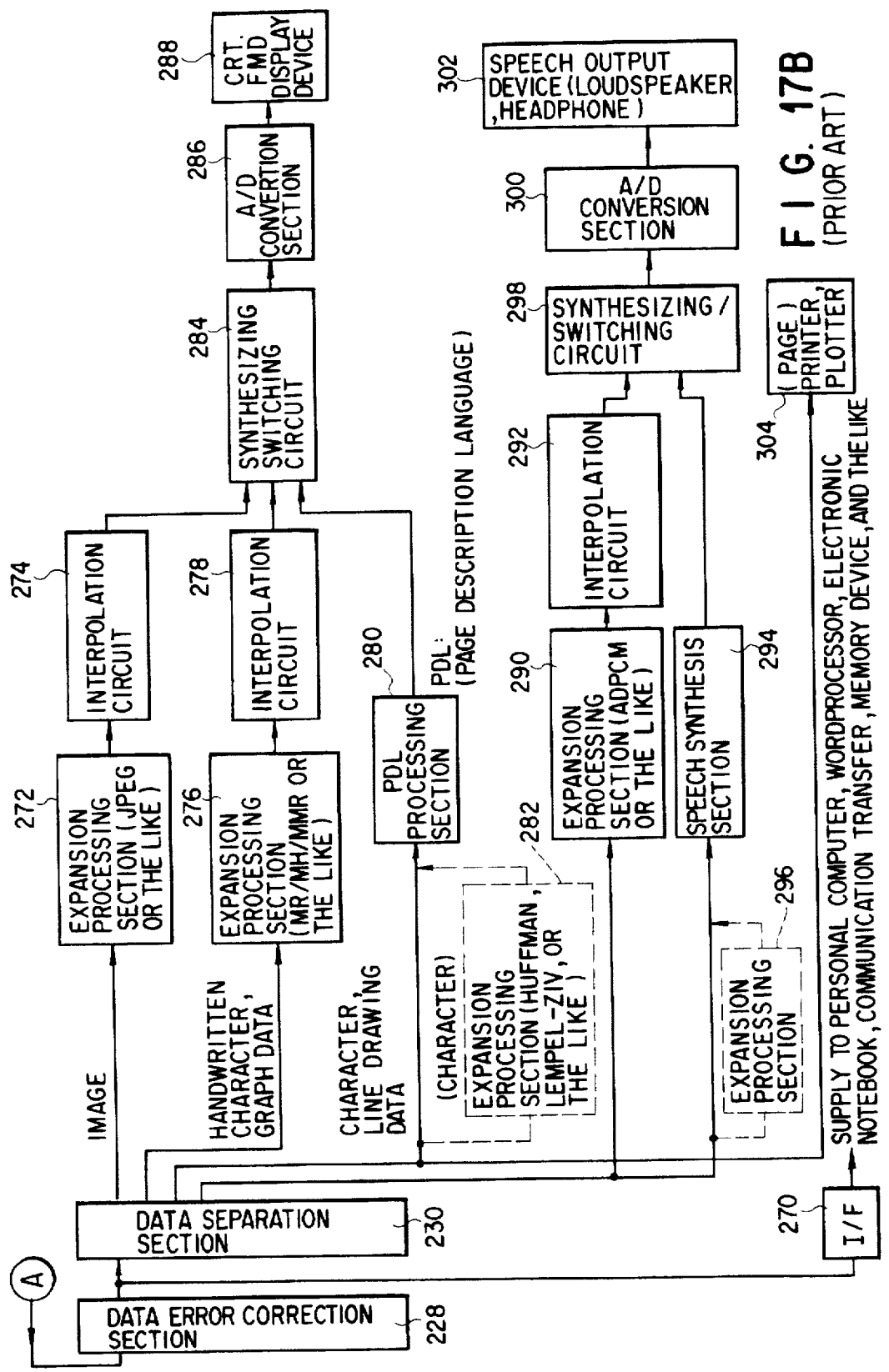

FIG. 1 is a block diagram showing the characteristic feature of the information reproducing apparatus of this embodiment. More specifically, an output from a CCD 10 serving as an image pickup section is converted into a video signal by an image pickup process circuit 12 and then converted into digital data by an A/D conversion section 14. Thereafter, the digital data is temporarily written in a field memory 18 in accordance with a write address generated by an address/coefficient generation circuit 16. The data written in the field memory 18 is read out in accordance with a read address generated by the address/coefficient generation circuit 16 and interpolated by an interpolation circuit 20 in accordance with an interpolation coefficient generated by the address/coefficient generation circuit 16. Thereafter, the data is edge-emphasized by a high-frequency emphasis circuit 22 and binarized by a binarization circuit 24. The binary data is demodulated by a demodulating circuit 26 and supplied to a data array adjusting section 226 (not shown in FIG. 1), as shown in FIGS. 17A and 17B, through a switch (SW) 28.

The address/coefficient generation circuit 16 generates the write address for the field memory 18. At the same time, the address/coefficient generation circuit 16 distributes the read address and the interpolation coefficient, which are converted and output by a coordinate conversion circuit 32 in accordance with a coordinate conversion coefficient set by a central processing unit (CPU) 30, or performs various control for, e.g., generating a write enable signal and the like to adjust the timing. The CPU 30 calculates the inclination amount of the pen type reading device with respect to the sheet from an output from each detection or calculation section (to be described later in detail) and sets the inclination amount in registers (not shown) constituted in the coordinate conversion circuit 32. The coordinate conversion circuit 32 accumulates/adds the value set in the register (to be described later in detail), thereby generating the write address, the read address, and the interpolation coefficient.

The digital data from the A/D conversion section 14 is also input to a luminance level detection circuit 34. The luminance level detection circuit 34 calculates average luminance data and determines entire brightness from the average luminance data, thereby performing control for changing the gain to the image pickup process circuit 12 by automatic gain control (AGC). At the same time, the luminance level detection circuit 34 supplies the average luminance data to a luminance variation calculation circuit 36. The luminance variation calculation circuit 36 calculates a luminance variation from the received average luminance data and supplies the calculation result to the CPU 30 and a threshold generation circuit 38. The threshold generation circuit 38 uses the luminance variation data and a histogram value for each frame or each block in a frame to determine a threshold level for binarization by the binarization circuit 24.

The digital data from the A/D conversion section 14 is also input to a contrast detection circuit 40. The contrast detection circuit 40 detects a contrast level and supplies the contrast level to a blur amount calculation circuit 42. The blur amount calculation circuit 42 calculates a blur amount from the received contrast level data and supplies the calculation result to the CPU 30 and a coefficient generation circuit 44. The coefficient generation circuit 44 sets a filter coefficient for the high-frequency emphasis circuit 22 in accordance with the received blur amount.

An output from the binarization circuit 24 is supplied to a marker detection circuit 46. The marker detection circuit 46 detects a marker 210 (FIG. 16) of each block and supplies the detection result to a marker size calculation circuit 48, a data array direction detection circuit 50, and a shift amount calculation circuit 52. The marker size calculation circuit 48 calculates the size of the marker 210 from the received marker detection result and inputs the calculation result to the CPU 30. The data array direction detection circuit 50 detects the data array direction including rotation by using the marker 210 detected by the marker detection circuit 46 and supplies the detection result to the CPU 30. The shift amount calculation circuit 52 calculates a position shift amount from the marker detection result and supplies the calculation result to the CPU 30.

An output from an inclination sensor 54 is amplified by an amplifier 56 and converted into digital data by an A/D converter 58, and the digital data is input to the CPU 30. At the same time, the CPU 30 receives lens aberration information for correcting a distortion in lens aberration in an image formation optical system (not shown) from a non-volatile memory (EEPROM) 60.

The CPU 30 sets the coordinate conversion coefficient in the coordinate conversion circuit 32 on the basis of the luminance variation, the blur amount, the size of the marker 210, the data array direction, the shift amount, the output from the inclination sensor, and the lens aberration, thereby generating the read address and the interpolation coefficient. The CPU 30 supplies data, free from the influence of inclination of the pen type reading device with respect to the sheet, to the signal processing system on the subsequent stage through the address/coefficient generation circuit 16. Alternatively, a priority may be set for the received data, and the coordinate conversion coefficients may be set in accordance with the received information with high priority. The method of using the input data for setting the coordinate conversion coefficients can be appropriately changed in accordance with the operated state because the CPU 30 is used. Therefore, signal processing can be efficiently performed.

The CPU 30 also performs ON/OFF control of the switch 28 (to be described later).

Note that circuits subsequent to the switch 28 are the same as those subsequent to the data array adjusting section 226 of the circuit as shown in FIGS. 17A and 17B. In the data array adjusting section 226, the block addresses of the above two-dimensional blocks are detected by a block address detection section 262 first, and error detection and correction of the block addresses are then performed by a block address error detection/correction section 264. Thereafter, an address control section 266 stores the resultant data in a data memory section 268 in units of blocks. By storing the data in units of block addresses in this manner, the data can be efficiently stored even if an intermediate data portion is omitted or data is inserted in the process of storing the data.

After this operation, error correction of the data read out from the data memory section 268 is performed by the data error correction section 228. An output from the data error correction section 228 is branched to two ways. One output is supplied, as digital data, to a personal computer, a wordprocessor, an electronic notebook, or the like through an I/F 270. The other output is supplied to a data separation section 230 to be separated into image data, handwritten character or graph data, character or line drawing data, and sound data (including two types, i.e., sound data without any processing and data having undergone speech synthesis).

Image data corresponds to natural image data, which is multi-value image data. An expansion processing section 272 performs expansion processing of this data, which corresponds to JPEG in data compression. In a data interpolation circuit 274, data for which error correction cannot be performed is interpolated.

For binary image information as of a handwritten character or a graph, an expansion processing section 276 performs expansion processing corresponding to MR/MH/MMR in data compression. In a data interpolation circuit 278, data for which error correction cannot be performed is interpolated.

Character or line drawing data is converted into a different pattern for display by a PDL (Page-Description Language) processing section 280. Note that even line drawing or character information which has been coded and undergone compression processing for a code is subjected to corresponding expansion (Huffman coding, Lempel-Ziv, or the like) processing in an expansion processing section 282, and is supplied to the PDL processing section 280.

Outputs from the data interpolation circuits 274 and 278 and the PDL processing section 280 are synthesized or selected by a synthesizing/switching circuit 284. The resultant data is converted into an analog signal by a D/A conversion section 286. Thereafter, the corresponding information is displayed on a display section 288 such as a CRT or an FMD.

Speech information is subjected to expansion processing in an expansion processing section 290, which corresponds to ADPCM. Furthermore, in a data interpolation circuit 292, data for which error correction cannot be performed is interpolated. In performing speech synthesis, a speech synthesis section 294 receives a code for speech synthesis, actually synthesizes speech from the code, and outputs it. In this case, if the code itself is compressed, speech synthesis is performed after expansion processing such as Huffman coding or Lempel-Ziv processing is performed in an expansion processing section 296, as in the case of the above character or line drawing information.

Outputs from the data interpolation circuit 292 and the speech synthesis section 294 are synthesized or selected by a synthesizing/switching circuit 298. The resultant data is then converted into an analog signal by a D/A conversion section 300. The signal is output to a loudspeaker, a headphone, or a speech output device 302 equivalent thereto.

Character or line drawing information is directly output from the data separation section 230 to a page printer or plotter 304. As a result, the character information can be printed, as wordprocessor characters, on a paper sheet, or the line drawing information can be output, as a drawing, from a plotter.

As is apparent, image information can also be printed by a video printer as well as being displayed on a CRT or an FMD, or the image can be photographed.

In this embodiment as well, to obtain an effect, all the sections except for an output device (a CRT, an FMD, a loudspeaker, a headphone, a printer, a plotter, or the like) preferably constitute a handy type reading device which is held by a hand to scan a dot code on a sheet, especially, a pen type reading device. However, sections to be incorporated in the pen type reading device, or the type of the apparatus other than the pen type reading device can be appropriately selected as a matter of course.

A method of removing the influence of the inclination of the pen type reading device will be described below. For the descriptive convenience, an inclination detection operation and an inclination correction operation will be independently described.

Figure 2A:
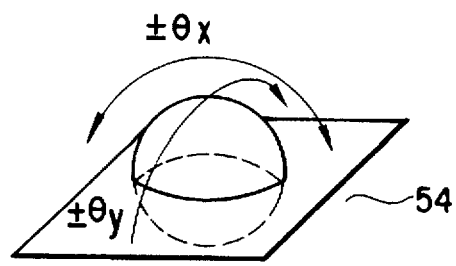
FIG. 2A is a view showing the shape of an inclination sensor.
Figure 2B:
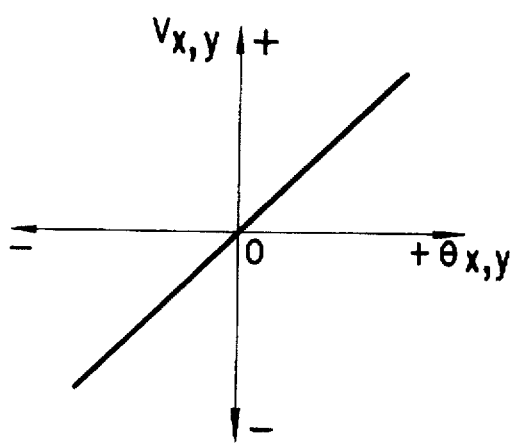
FIG. 2B is a view showing an output from the inclination sensor.
Figure 2C:
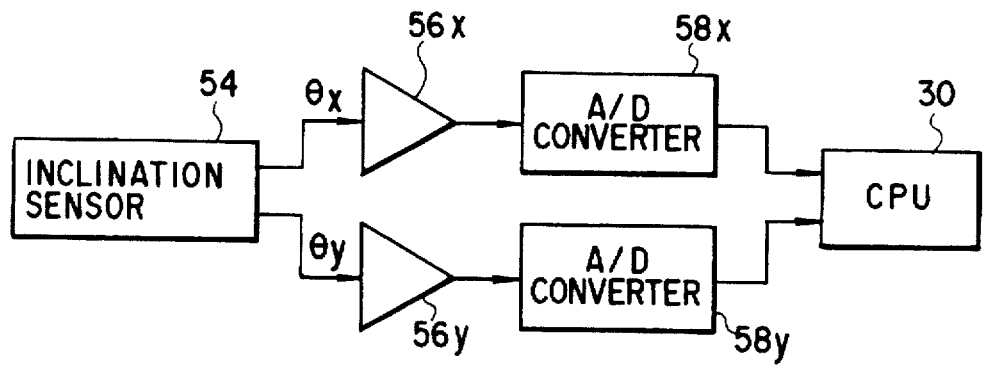
FIG. 2C is a circuit diagram showing a circuit for processing the output from the inclination sensor.

The principle of inclination detection using the inclination sensor 54 will be described first. The inclination sensor 54 has a hemispherical shape as shown in FIG. 2A. With this sensor, inclinations in two directions perpendicular to each other, i.e., inclinations θx and θy are detected to obtain an inclination detection output as a positive or negative value, as shown in FIG. 2B. More specifically, if a value θ is "0", the output is 0V. As the value θ becomes larger, a positive potential is obtained with an inclination in the positive direction, and a negative potential is obtained with an inclination in the negative direction. This potential signal is obtained in proportion to the inclination. Actually, after the potential is amplified to a desired potential by amplifiers 56x and 56y, as shown in FIG. 2C, and converted into digital data by A/D converters 58x and 58y, an inclination is calculated by the CPU 30.

In the pen type reading device of this embodiment, the hemispherical inclination sensor 54 is loaded at the distal end of the rear end portion of a pen type reading device 62. Assume that the pen type reading device 62 is held to be inclined, as shown in FIG. 3A. In this case, when the inclination amount of the pen type reading device 62 corresponds to an angle θx formed by a perpendicular 68 from a sheet 64 with respect to the direction of an axis 66 of the pen type reading device 62, the inclination θx is obtained from the output from the inclination sensor 54.

The relationship between the obtained value and the image distorted due to the actual inclination can be explained by a right-angled triangle as shown in FIG. 3B. More specifically, an oblique side x of this right-angled triangle corresponds to an image which is actually obtained by the CCD 10. Actually, an image having a size X must be obtained. However, an image having the size x is actually obtained in place of the image having the size X, which is to be originally obtained. When a ratio of these sizes is calculated, the magnification of the image can be detected.

Therefore, since the values x, ex, and X satisfy a relation cosθx=X/x, a ratio representing the magnification is given as x/X=1/cosθx.

The CPU 30 performs an arithmetic operation in accordance with the value θx according to the digital signal from the A/D converter 58x and supplies the operation result to a controller 70 as shown in FIG. 3C. The controller 70 is a unit including the address/coefficient generation circuit 16 and the coordinate conversion circuit 32 for the descriptive convenience.

The controller 70 generates an address Add and a coefficient k on the basis of the above ratio according to the inclination amount, i.e., the distortion amount of the image from the CPU 30 and supplies the address Add and the coefficient k to the field memory 18 and the interpolation circuit 20, thereby performing data correction.

More specifically, the data is temporarily input and written in the field memory 18 in accordance with a write address from the controller 70. Thereafter, in accordance with the distortion amount, the read address Add is generated by the controller 70 to read the data written in the field memory 18. In the interpolation circuit 20, the data is interpolated in accordance with the interpolation coefficient k from the controller 70, and the correction data is output.

The controller 70 (to be described later in detail) is constituted by an accumulation/addition circuit as shown in FIG. 3D. More specifically, the accumulation/addition circuit comprises an adder 32a and one-clock shift circuit (T) 32b. A sum result is output with a delay of one clock, and this output is simultaneously fed back to the adder 32a. Input data to this accumulation/addition circuit is switched by a switch 16a in the write and read modes of the field memory 18.

More specifically, in the write operation for writing the input data in the field memory 18, the switch 16a is set to "write" (W) side, and a numerical value of "1" is input to the accumulation/addition circuit. As a result of sequential accumulation/addition of the input values, a result of sequential addition of the numerical value of "1", is output from the address Add as "0", "1", "2", "3", "4", "5", . . . . With this write address, the input data from the A/D conversion section 14 is written in the field memory 18. After this operation, the switch 16a is set to "read" (R) side. The numerical value 1/cosθx calculated by the CPU 30 from the output from the inclination sensor 54 is input and accumulated/added. With this processing, the read address Add according to the distortion is generated, and the distortion is corrected.

Although only the numerical value 1/cosθx has been described above, numerical values cosθx and cosθy are also actually required. That is, these values are related to the addresses in the x and y directions, respectively. For this reason, the amplifier 56y and the A/D converter 58y, both of which are the same as those in the x-coordinate system, are constituted in the y-coordinate system as well.

In this manner, when the inclination sensor 54 is used, the inclination of the pen type reading device 62 can be directly detected by the inclination sensor 54 without special image processing. Therefore, inclination detection and correction can be realized with a very simple circuit.

A method of detecting a failure in proper image reading, which is caused due to image darkening, a blur, a change in image size, or a shift of a marker from an original position when the pen type reading device 62 is inclined, and correcting the image on the basis of the false image, i.e., the false phenomenon will be described below.

When a luminance variation shown in FIG. 18C on the right side at the uppermost stage is generated, i.e., when a bright portion and a dark portion are generated, a threshold level cannot be optimally determined in the binarization section for the subsequent processing. For this reason, binarization cannot be properly performed, and marker detection is undesirably erroneously determined. A countermeasure for this will be described.

When an object is dark, the image pickup process circuit 12 detects the darkness to control AGC (Automatic Gain Control). In the AGC control, in the luminance level detection circuit 34, high-frequency components are removed from the digital data as an output from the A/D conversion section 14 through a low-pass filter, and average luminance data of only low-frequency components is calculated. The entire brightness is determined from the average luminance data, thereby changing a gain of the image pickup process circuit 12 by AGC.

Figure 4A:
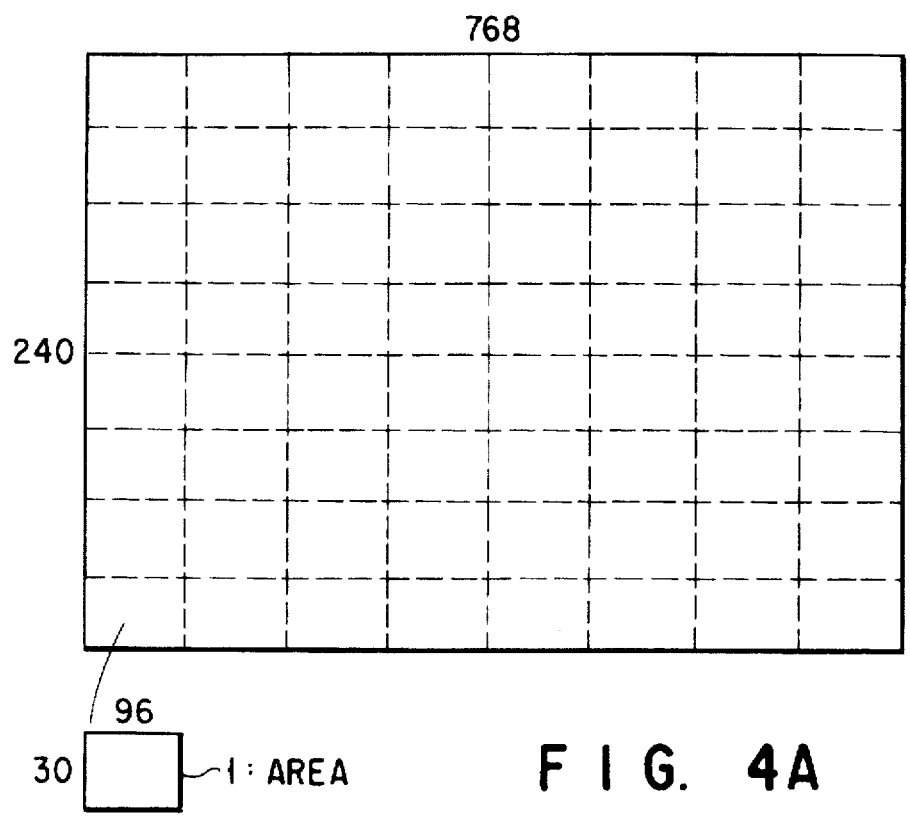
FIG. 4A is a view showing 64 areas obtained by dividing image data corresponding to one frame of one field into 64 areas.
Figure 5A:
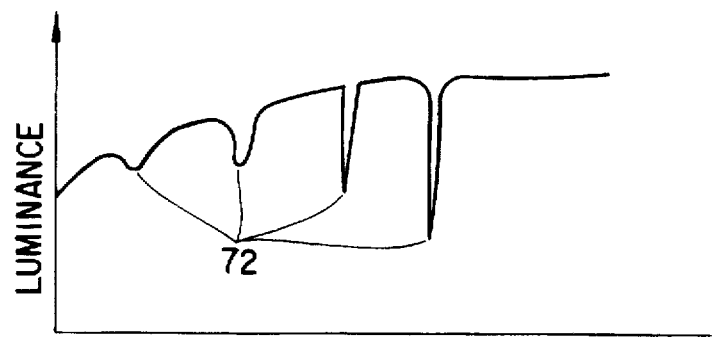
Figure 5B:
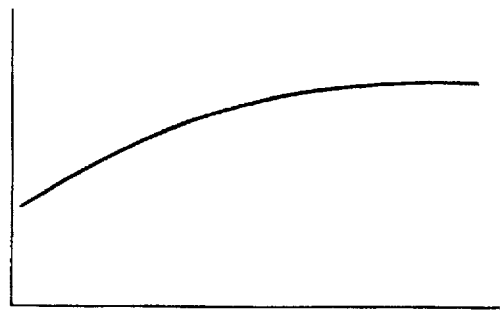

More specifically, as shown in FIG. 4A, image data of one frame in one field is divided into 64 areas. Assume that the pixels of the CCD 10 includes 768 pixels in the horizontal direction and 240 pixels in the vertical direction. In this case, 96 pixels in the horizontal direction and 30 pixels in the vertical direction are contained in one area obtained by dividing one frame into 64 areas. The luminance level detection circuit 34 detects average luminance data for each area. A method of detecting average luminance data for each area will be described. Assume that a signal as shown in FIG. 5A is photographed. Referring to FIG. 5A, a portion with a higher luminance level is bright, and a portion with a lower luminance level is dark. Therefore, peaks 72 facing down represent black points, i.e., dot data. Since the pen type reading device 62 is inclined, the entire luminance level becomes lower toward the left side of FIG. 5A, and the luminance level becomes higher along with a decrease in influence of the inclination. If the inclination of the pen type reading device 62 can be detected, the above-described disadvantage in binarization is eliminated. When this signal is caused to pass through the low-pass filter, luminance data of a background portion from which black portions corresponding to the dot data are removed can be extracted, as shown in FIG. 5B. The signal obtained upon removal of the black portions is accumulated/added for each area and converted into average luminance data. In this case, since the number of data is too large, much time is required for determination in the CPU 30. In this embodiment, average luminance data for each area is obtained, thereby obtaining the average luminance data for a total of 64 areas. The luminance variation is determined from the 64 average luminance data, thereby quickly performing signal processing.

Actually, the luminance level detection circuit 34 is constituted by filter 74, an area accumulation/addition circuit 76, and a memory 78, as shown in FIG. 6A. The input data passes through the filter 74. The to-be-obtained data corresponds to only the background portion free from the high-frequency components such as dots. Considering that the to-be-obtained data is present in a relatively lower frequency band, the data is caused to pass through the low-pass filter (LPF) to remove the high-frequency components. That is, when the luminance level is to be calculated, the filter 74 serves as a low-pass filter. Thereafter, in the area accumulation/addition circuit 76, accumulation/addition is performed in the area obtained by dividing one frame into 64 areas, i.e., in the area constituted by 96×30 pixels. This accumulation/addition means the sum of all the blocks. After the sum of pixel data of all the blocks is obtained, the resultant data is stored in the memory 78.

Figure 5C:
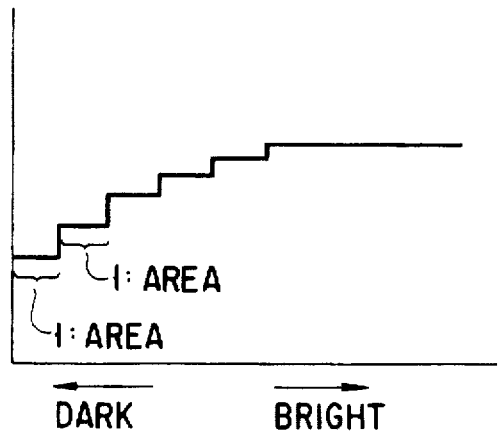

In this manner, the data shown in FIG. 5A is smoothed through the low-pass filter, as shown in FIG. 5B, and the sum for each area is calculated. With this operation, average luminance level data including average levels for the respective areas are obtained stepwise, as shown in FIG. 5C. From this average luminance level data, the direction and degree of darkness of the pickedup image can be easily determined.

By feeding back the obtained average luminance level data to the image pickup process circuit 12, the level is controlled by AGC.

From the average luminance level data, the direction and degree of darkness of the pickedup image can be determined. For this reason, the average luminance level data is supplied to the luminance variation calculation circuit 36 to calculate the luminance variation. More specifically, in calculation of the luminance variation, when all the data obtained upon accumulation/addition in the area accumulation/addition circuit 76 form a straight line, it is determined that no luminance variation is generated. However, when the stepwise distribution is formed as shown in FIG. 5C, it is determined that a luminance variation is present. The luminance variation calculation circuit 36 calculates the degree of variation. Actually, the luminance variation calculation circuit 36 performs processing for causing the average luminance level data from the luminance level detection circuit 34 to pass through the low-pass filter. The resultant data is input to the CPU 30 and used for inclination correction.

The average luminance level data from the luminance level detection circuit 34 is also supplied to the threshold generation circuit 38 and used to determine a threshold level for binarization in the binarization circuit 24. This operation will described below.

Figure 7A:
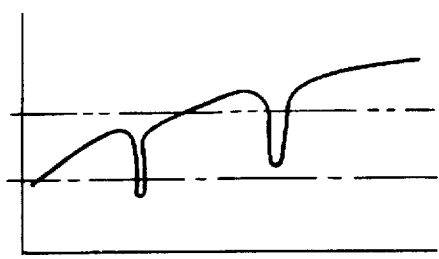

Assume that the original signal supplied from the high-frequency emphasis circuit 22 to the binarization circuit 24 has a dark portion on the left side and a bright portion on the right side, and dark portions representing the dots are present midway. This signal is assumed to be binarized in the binarization circuit 24. When a threshold level is set at a level indicated by a chain line in FIG. 7A, the dot on the right side is not reproduced. When a threshold level is set at a level indicated by a chain double-dashed line, the dot on the left side is not reproduced. As described above, it is very difficult to determine a threshold level.

Figure 7B:
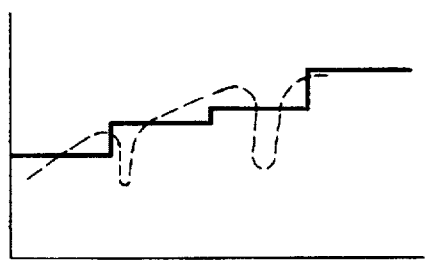

In this embodiment, a threshold level is determined by the following method. First of all, the original signal from the high-frequency emphasis circuit 22, which is indicated by a dotted line in FIG. 7B, is divided into a predetermined number of blocks, and accumulation/addition is performed.

Figure 7C:
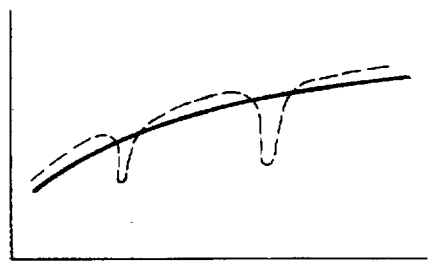
Figure 7D:
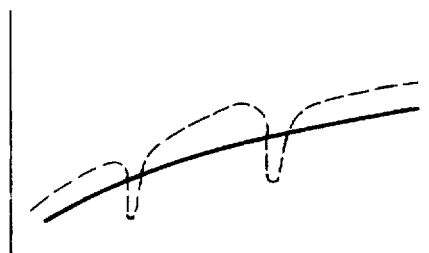

Accumulated/added data corresponds to the sum for each block. In this case, however, the sum value becomes very large, and a value obtained by dividing the sum value by the number of pixels is considered as accumulation/addition data. Therefore, an average value, i.e., average luminance data in that area is defined as accumulation/addition data. This data is indicated by a solid line in FIG. 7B. This accumulation/addition data is stepwise and inconvenient to use. For this reason, this data is caused to pass through the low-pass filter, i.e., smoothing processing is performed by software. By using such a low-pass filter, a value indicated by a solid line in FIG. 7C is obtained. This value is output as a value almost matching the luminance level of the background portion of the image data. The dots are almost ignored in determination of the entire luminance level because of their very small ratio to the entire background portion, so that the luminance level of the background is mainly calculated. Therefore, a level close to that of the background portion can be easily obtained from the output from the low-pass filter. In this manner, the level of the background portion is almost determined. However, when this level is used as a threshold without any further processing, this level is too close to the level of the background portion. For this reason, this value is multiplied by a fixed coefficient k (k<1, e.g., normally k=0.7 or 0.8) to obtain a level slightly lower than that of the output from the low-pass filter. With this operation, an optimal value as a threshold level as shown in FIG. 7D is obtained. When this value is set as a threshold level for binarization, a binary signal accurately representing the dots can be obtained.

Figure 7E:
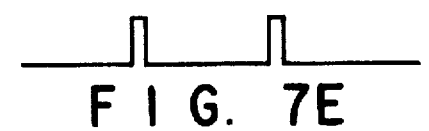

In the actual arrangement, the threshold generation circuit 38 receives luminance variation data indicated by the solid line in FIG. 7C from the luminance variation calculation circuit 36 and multiplies the data by the coefficient k, thereby generating the threshold level to be sent to the binarization circuit 24. With this operation, the binarization circuit 24 receives the data indicated by the dotted line in FIG. 7D while comparing the received data with the threshold level indicated by the solid line in FIG. 7D, which is generated by the luminance variation calculation circuit 36. As a result, an output as shown in FIG. 7E is obtained to accurately reproduce the dots.

With this arrangement, the process of detecting a luminance level using the luminance level detection circuit 34 and controlling the level by AGC is generally applied in a camera circuit of this type. Therefore, only when the circuit for controlling the level by AGC is applied, the threshold level for binarization can be easily generated at a low cost, and erroneous detection of a marker or a dot, which is caused due to the inclination of the reading device can be prevented.

An autofocusing function is often used in many camera circuits. The pen type reading device 62 of this embodiment does not have the autofocusing function. However, by using the principle of autofocusing, a blur amount as shown in FIG. 18C on the right side at the second stage can be calculated in the contrast detection circuit 40 and the blur amount calculation circuit 42.

Figure 8A:

More specifically, in autofocusing control used in a general video camera or the like, the original signal as shown in FIG. 8A is caused to pass through a bandpass filter, thereby removing low-frequency components from the signal and extracting only the high-frequency components. An autofocusing lens is controlled to obtain a maximum output of the high-frequency components, thereby automatically performing a focusing operation. That is, when a large output is obtained from the bandpass filter, an in-focus state is set. The autofocusing function is based on a principle in which, when an in-focus state is set, a sharp edge is obtained, and as a result, the high-frequency components become large.

Figure 8B:
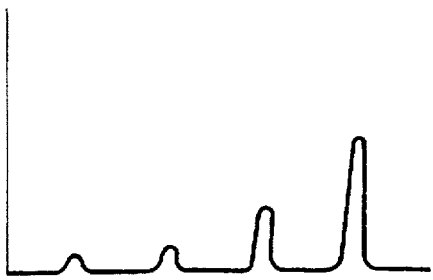
Figure 8C:
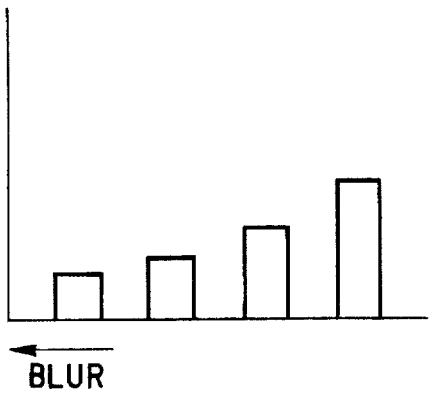

By applying this principle, a blur or non-blur of an image can be detected. First of all, a signal corresponding to only a portion with dots as shown in FIG. 8B can be extracted from the original signal in FIG. 8A through a bandpass filter corresponding to the space frequency of the dot or the marker. For the obtained signal, accumulation/addition is performed for each area as in the above-described luminance level detection to obtain a result for each area, as shown in FIG. 8C. Referring to FIG. 8C, peak values become smaller toward the left side because the image blur becomes larger toward the left side. The peak values become larger toward the right side because the image is more exactly set in an in-focus state toward the right side. That is, when the original signal in FIG. 8A is caused to pass through the bandpass filter, an output from the bandpass filter becomes larger toward the right side because the high-frequency components are contained in larger quantities toward the right side. Therefore, from the result in the FIG. 8C, it can be determined that the image becomes blurred toward the left side and set in an in-focus state toward the right side, and inclination detection can be performed at a high sensitivity while detecting a steep change in contrast.

The circuit for detecting the inclination, i.e., the contrast detection circuit 40 can be constituted by the filter 74, the area accumulation/addition circuit 76, and the memory 78, as shown in FIG. 6A, as in the above-described luminance level detection circuit 34. In this case, however, as the filter 74, a filter such as a high-pass filter (HPF) or a bandpass filter (BPF), which removes low-frequency components and passes only high-frequency components is used.

Actually, as shown in FIG. 6B, the luminance level detection circuit 34 causes an input signal to pass through a low-pass filter 74Y, performs accumulation/addition in an area accumulation/addition circuit 76Y, and stores the resultant data in a memory 78Y, thereby obtaining the luminance level data. The contrast detection circuit 40 causes an input signal to pass through a bandpass filter 74C, performs accumulation/addition in an area accumulation/addition circuit 76C, and stores the resultant data in a memory 78C, thereby obtaining contrast data representing only the high-frequency components.

Each of the luminance level detection circuit 34 and the contrast detection circuit 40 may have the same circuits. However, to simplify the circuit arrangement, the low-pass filter 74Y and the bandpass filter 74C are parallelly arranged because of their different functions, and the area accumulation/addition circuit 76 and the memory 78 are preferably switched by a switch 80 at a certain timing to be commonly used. The switching timing is appropriately set such that these circuits are switched for each field or each frame, or between the upper and lower portions of a frame.

The contrast data detected in this manner is supplied to a blur amount calculation circuit 42. The blur amount calculation circuit 42 calculates a blur amount representing the degree of blur on the basis of the contrast data. Actually, a signal as shown in FIG. 8C is converted into a form which can be received by the CPU 30. The calculated blur amount data is input to the CPU 30 and used for inclination correction.

The blur amount data calculated in the blur amount calculation circuit 42 is also supplied to the coefficient generation circuit 44 and used to determine a filter coefficient of the high-frequency emphasis circuit 22. This operation will be described below.

Generally, since the frequency characteristics of a lens (not shown), the CCD 10, or the image pickup process circuit 12 do not cover the high-frequency region, the Modulation Transfer Function (MTF) of an analog input signal is degraded, and an ideal signal cannot be obtained. If a signal as shown in FIG. 9A is received, this signal should actually have sharper curved portions. However, since the MTF characteristics are degraded, the curved portions indicated by dotted circles in FIG. 9A become moderate. Because of this moderate waveform, noise influences to disable proper binarization in the binarization circuit 24. On the other hand, it is known that, when a change amount per unit time near a threshold level TL is made steep, i.e., when the rise and fall times are made shorter, binarization can be properly performed. Normally, a filter serving as the high-frequency emphasis circuit 22 is interposed to forcibly emphasize the high-frequency components of the signal, as shown in FIG. 9B, thereby forcibly shortening the rise and fall times. After this preprocessing, binarization is performed by the binarization circuit 24, thereby properly performing binarization while eliminating the influence of noise.

When a blur is generated due to the inclination of the pen type reading device 62 (306), as shown in FIG. 18B, the waveform which has already become moderate because of degradation in MTF characteristics even in the normal state becomes further moderate, as shown in FIG. 9C. Therefore, if such a blur is generated, a desired amplitude cannot be obtained, and a long time is required for change. For this reason, the signal easily suffers the influence of noise. When this image with a blur is simply caused to pass through the filter serving as the high-frequency emphasis circuit 22, correction by complete edge emphasis cannot be performed, and an ideal signal cannot be obtained yet, as shown in FIG. 9D.

In this embodiment, the circuit is arranged such that the filter coefficient of the high-frequency emphasis circuit 22 can be changed, i.e., the high-frequency components can be highly emphasized, thereby obtaining an ideal input signal for binarization. The filter coefficient is generated in the coefficient generation circuit 44 in accordance with blur amount information from the blur amount calculation circuit 42. Therefore, high-frequency emphasis can be performed in correspondence with the blur amount.

Figure 10A:
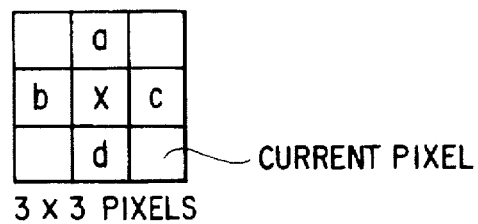
FIG. 10A is a view showing pixels used in a 3×3 Laplacian filter used by the high-frequency emphasis circuit.
Figure 10B:
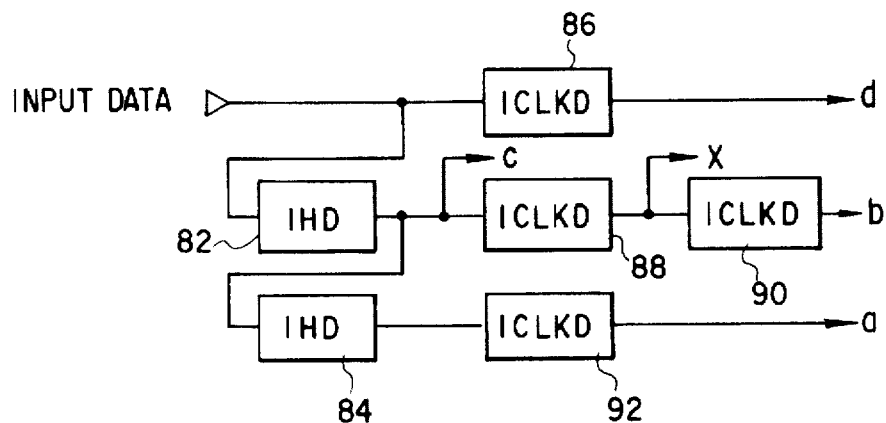
FIG. 10B is a circuit diagram showing the arrangement of the Laplacian filter.

The filter used for the high-frequency emphasis circuit 22 is a 3×3 Laplacian filter as shown in FIG. 10A. The 3×3 represents nine pixels including one central pixel (pixel X) as a target. This very simple Laplacian filter with 3×3 pixels uses five pixels a, b, c, d, and X of the nine pixels. The pixels adjacent to each other in the vertical direction have different lines while the pixels adjacent to each other in the horizontal direction have different dots. For this reason, as shown in FIG. 10B, the Laplacian filter is constituted by delay elements (1HD) 82 and 84 for one line and delay elements (1CKLD) 86, 88, 90, and 92 for delaying only one clock. More specifically, a system for delaying input data by 1H and a system for delaying the input data by 2H are arranged. If current input data is assumed to be a current pixel shown in FIG. 10A, a pixel delayed by the 1CLKD 86 by one clock, i.e.,.. an immediately preceding pixel d is output. In addition, since a line before the line of the current pixel by 1H is a line including the pixels b, X, and c, the pixel c is output as a pixel before the current pixel by 1H, which is output from the 1HD 82. A pixel before the pixel c by one clock, which is output from the 1CLKD 88, is the pixel X, and a pixel before the pixel X by one clock, which is output from the 1CLKD 90, is the pixel b. A line before the current pixel by 1H, which is output from the 1HD 84, is a line including the pixel a, and the pixel a is output from the 1CLKD 92. Therefore, the pixels a, b, c, and d and the central pixel X can be obtained by this circuit.

Figure 10C:
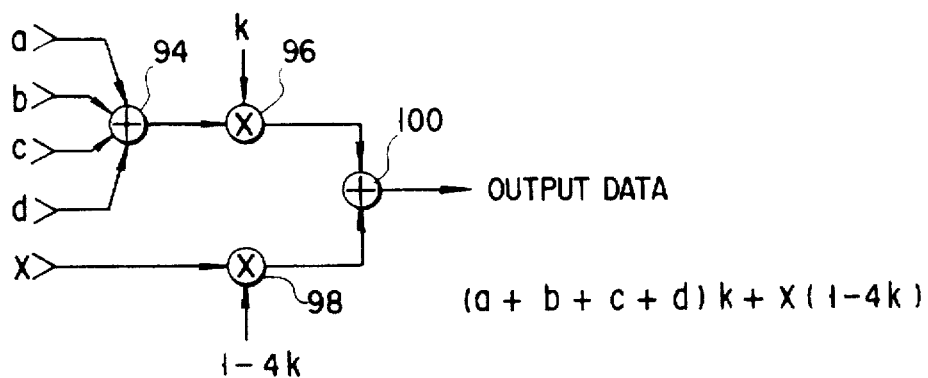
FIG. 10C is a circuit diagram showing an arithmetic circuit for multiplying an output in FIG. 10B by the coefficient generated by the coefficient generation circuit.

In the high-frequency emphasis circuit 22, these five pixels are arithmetically operated by the arithmetic circuit as shown in FIG. 10C. More specifically, an adder 94 adds all the peripheral pixels a, b, c, and d, and a multiplier 96 multiplies the sum result by a certain coefficient. A multiplier 98 multiplies the central pixel x by a certain value obtained by a predetermined operation of the above coefficient. The multiplication results from the multipliers 96 and 98 are added by an adder 100, and the resultant data is output to the binarization circuit 24 as output data.

Assuming that the coefficient to be multiplied by the pixels a, b, c, and d is a negative value, and the value to be multiplied by the central pixel x is obtained by subtracting a value four times the above negative value from one, edge emphasis can be realized. When the coefficient to be multiplied by the pixels a, b, c, and d is represented by k, the value to be multiplied by the target pixel X satisfies a relationship 1−4k, and output data is represented by (a+b+c+d)k+X(1−4k), where the value k is a negative value. However, as the negative value k becomes larger, the edge emphasis effect can be enhanced.

In normal binarization, the value k generated by the coefficient generation circuit 44 is set to "−1". Since the coefficient k to be multiplied in the multiplier 96 is "−1", the value to be multiplied in the multiplier 98 is "5". To obtain an enhanced edge emphasis effect, the value of the coefficient k generated by the coefficient generation circuit 44 is set to "−2". In this case, the value "−2" is given to the multiplier 96, and the value to be multiplied by X in the multiplier 98 is "9". With this operation, an ideal signal for binarization can be obtained, as shown in FIG. 9E.

In this manner, when the filter coefficient of the high-frequency emphasis circuit 22 can be appropriately changed in the coefficient generation circuit 44 on the basis of information from the blur amount calculation circuit 42, optimal binarization processing can be performed in accordance with the blur amount.

The filter of the high-frequency emphasis circuit 22 uses the two 1HDs although only the five pixels a, b, c, d, and X are used. For this reason, pixels at the four corners, which are indicated by spaces in FIG. 10A, can also be used. By using these pixels, a filter having another form can be freely arranged, as a matter of course.

A phenomenon will be described below in which the pixels are shifted from the original positions because of the inclination of the pen type reading device 62, as shown in FIG. 18C on the right side at the lowermost stage. When such a shift is generated, data cannot be properly read because of the absence of the marker 210 at an expected position. Therefore, this shift must be properly corrected.

FIG. 11 is an enlarged view showing the pixels shifted due to the inclination. Solid black circles represent the positions of the markers 210, which are obtained upon an actual image pickup operation and slightly shifted due to the inclination. Dotted circles represent the original positions of the markers 210. Therefore, the positions of the markers 210 are regularly aligned to form a square, as indicated by the dotted circles while the markers 210 obtained upon an actual image pickup operation form a slightly deformed square, as indicated by the solid black circles. When the shift amount is detected, the shift can be corrected. This detection is performed as follows.

First of all, consider a shift in an x direction. Assume that a marker 102 at the left corner of data obtained from the image pickup system is not shifted, and this marker 102 is used as a reference point. In this case, an original position 104 is actually unknown. However, with reference to the distance between a position 106 of the obtained marker (black point) and a position 108 of the next marker, a distance $x_1$ between the markers 102 and 106 is different from a distance $x_2$ between the markers 106 and 108. Similarly, in a y direction as well, the distances between the adjacent markers are different. If a result other than "1" is obtained by a simple division, it is found that the distances are different. At the same time, when the distance $x_2$ is divided by the distance $x_1$, and a result more than "1" is obtained, it is found that the distance sequentially increases, and vice versa. Therefore, when the distance between the two points is divided, the degree of change in magnification can be easily detected. Actually, calculation $x_2/x_1$ or $y_2/y_1$ in the x or y direction need to be performed. Generally, a magnification can be obtained as a form $x_n/x_{n-1}$ or $y_n/y_{n-1}$ in the x or y direction. If a result with respect to the obtained magnification is "1", the magnification can be determined to be accurate, and correction is not necessary. If a result is not "1", correction of the magnification must be performed in accordance with the obtained value.

For example, as shown in FIG. 12A, assume that $x_0$ is "4" and $x_1$ is "5", i.e., the ratio is 4:5, and the magnification is changed to be 1.25 times the original one. This is a case in which the markers 210 are located at positions "0" and "5" and are actually photographed and written in the field memory 18, as shown in FIG. 12B. When the entire data is corrected such that the distance between position "0" and "5" is reduced to the distance between positions "0" and "4", i.e., the pixel at position "4" becomes black, reduction is completed. When this data is to be read out from the field memory 18, the change amount of the read address is set to be larger than "1", thereby quickly reading the data. More specifically, as in the write mode, the pixel at position "0" is read out first, the pixel at position "1" is read out at the next timing, and the pixels at positions "2", "3", and "4" are sequentially read out. Since a black pixel appears as the fifth pixel, an address for reading a black pixel as the fourth pixel need to be generated. Therefore, a value obtained by dividing the distance "5" by "4", i.e., a pitch of "1.25" can be used to read out the data from the field memory 18. That is, the pixel at position "0" is read out first, and the pixel at position "1.25" is read out in place of the pixel at position "1". Subsequently, the pixels at positions "2.5", "3.75", and "5" are sequentially read out. In this manner, the pitch of the address during reading out from the field memory 18 is increased, thereby quickly reading the data. As a result, the pixel at position "5", which should be originally at position "4", can be read out as a pixel at the position "4", thereby correcting the magnification.

The circuit for generating addresses "1.25", "2.5", and "3.75" is actually constituted as the controller 70 consisting of the address/coefficient generation circuit 16 and the coordinate conversion circuit 32, as shown in FIG. 12C. The controller 70 can be realized by an accumulation/addition circuit as shown in FIG. 12D, as described above. More specifically, when the coefficients are input and sequentially added, the address Add and the interpolation coefficient k can be generated. In the write mode, the switch 16a is set to "write" side, and an input of level "1" is obtained. When the signal of level "1" is input to the accumulation/addition circuit, and the address Add is "0" first, as shown in FIG. 12E, the value of "0" is fed back to the adder 32a and added.

Since a signal of level "1" is input to the other input terminal of the adder 32a, the result from the adder 32a is "1". This value of "1" is output from the one-clock shift circuit 32b after one clock so that the result becomes "1". With the result of "1", the address Add becomes "1". When the value of "1", is output, the value of "1" is fed back and input to the adder 32a. Therefore, at this point of time, an output from the adder 32a becomes "2". This value of "2" is received at the next clock, and an output, i.e., a result of "2" is output. The address Add output from the controller 70 is updated in an order of "0", "1", "2", "3", "4", . . . , and also serves as a write address itself used to write the image data output from the CCD 10 in the field memory 18 in a one-to-one correspondence.

To the contrary, in the read mode, if the ratio of $x_0$ to $x_1$ is "1.25", the address is increased by a pitch of 1.25. With this operation, the marker 210 can be returned to the original coordinate position, and such an address need to be generated. The circuit for generating such an address can also be realized by the above-described accumulation/addition circuit. More specifically, the coefficient is set to "1" in the write mode. However, in the read mode, $x_n/x_{n-1}$ is calculated by a divider 54a arranged in the shift amount calculation circuit 52, and the resultant value is set as the coefficient. In the above example, a value of "1.25" is set. The accumulation/addition circuit is reset to "0" first. The value of "0" is fed back to the adder 32a. At the same time, a value of "1.25" is input to the adder 32a through the switch 16a. For this reason, a value of "1.25" is output from the adder 32a although the first output is "0". At the next clock, an output value of "1.25" from the adder 32a is sent to the output terminal from the one-clock shift circuit 32b, and a value of "1.25" is output. When the value of "1.25" is output, the value of "1.25" is simultaneously fed back to the adder 32a, so that a value of "2.5" is output from the adder 32a. The value of "2.5" is sent after one clock and output as a result. Similarly, results of "0", "1.25", "2.5", "3.75", "5", "6.25", "7.5", . . . are output, so that addresses having a pitch required for reading are generated.

The address Add corresponds to the integer part of the resultant data. The remaining decimal part is given as the interpolation coefficient k. Even when a pixel at position "1.25" is to be read, no pixel is actually present at position "1.25". This position "1.25" is present between positions "1" and "2" and corresponds to a position separated from position "1" by "0.25". For example, a pixel at position "2.5" can be approximate to a pixel at an intermediate position between positions "2" and "3". A pixel at position "3.75" can be approximate to a pixel at a position between positions "3" and "4" and separated from position "3" by "0.75". Therefore, an operation using this weighted average is required to perform interpolation using the coefficient k at both the points. When the integer part of the resultant data of accumulation/addition is sent to the field memory 18 as the address Add, and the decimal part is sent to the interpolation circuit 20 as the interpolation coefficient k, coordinate conversion can be realized.

The magnification for this processing can be determined as follows. More specifically, only the marker 210 is detected from an output from the binarization circuit 24 by the marker detection circuit 46. The method of detecting the marker 210 is described in detail in Japanese Patent Application No. 5-260464. This method will be briefly described below. The marker 210 has a size much larger than that of a data dot, so that it is determined first whether the dot is a data dot or the marker 210. This can be determined from the difference in size. If the dot is determined as the marker 210, the center of gravity of the marker 210 is detected. By this processing, the number of dots of the marker 210 is counted, and the address at the center of the marker 210 is determined. After the position of the marker 210 is detected, the shift amount calculation circuit 52 performs the above division, i.e., $x_n/x_{n-1}$ on demand to detect the positional relationship between the adjacent markers 210 from the detected position of the marker 210. That is, by performing this division, the shift amount can be calculated.

Although the operation in the x direction has been described above, the operation in the y direction is the same.

Figure 4B:
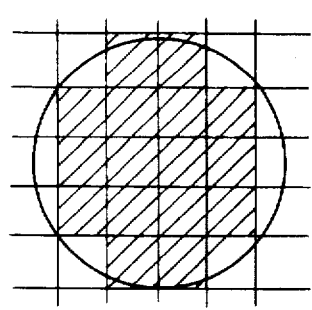
FIGS. 4B and 4C are views showing a marker which is picked up at an in-focus position and a marker which is distorted to be larger upon picking up in an inclined state, respectively.
Figure 4C:
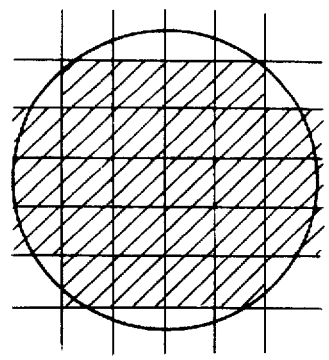

As a phenomenon caused due to the inclination of the pen type reading device 62, the marker 210 may be sequentially thickened, as shown in FIG. 18C on the right side at the third stage. In this case as well, when the size of the marker 210 is detected, the change amount of the magnification can be detected. Referring to FIG. 18C, the marker 210 indicated by a circle on the left side is at an in-focus position. However, the marker 210 on the right side is photographed in an inclined state to cause a slight distortion, resulting in a larger size. When this resultant data is binarized to detect the marker by the marker detection circuit 46, the painted portion is determined as black. As shown in FIG. 4B, when the number of dots of the black portions is counted, the number of dots of the black portions of the marker without any change in size is "16", and that of the marker with a larger size in an inclined state is "26". In this case, the area is increased by 26/16. Assuming that the marker is distorted at the same ratio in both the x and y directions, the value of the root square of the respective ratios in the x and y directions corresponds to a shift amount. When a division is performed, the shift amount is "1.27" in this example. Therefore, when a marker having a larger size of "26" is corrected to a size of "16", the distortion in magnification caused due to the inclination can be eliminated.

The same reduction processing as that for the resultant data calculated from the shift amount of the marker 210 need to be performed. When the magnification, i.e., the root square of $x_1/x_0$ is calculated by the marker size calculation circuit 50, the resultant value is input in place of $x_n/x_{n-1}$ in FIG. 12D, correction by the shift of magnification can be realized in the same circuit.

In the circuit in FIG. 1, a circuit for correcting the lens aberration and a circuit for correcting the inclination, i.e., rotation with respect to the data array direction of the pen type reading device 62 are also incorporated, as in the above-described U.S. Ser. No. 08/123,533.

A method of correcting a distortion in lens aberration is determined by the characteristics of the lens or changes when a shift with respect to the CCD 10 is caused at the time of assembly. The distortion data is stored in the EEPROM 60. When data is to be read out from the field memory 18, the CPU 30 performs correction on the basis of the data in the EEPROM 60. The lens distortion information can be written in the EEPROM 60 at the time of manufacture and assembly of the apparatus or delivery.

The inclination, i.e., rotation with respect to the data array direction, means scanning in an inclined state with respect to the data array direction. In this phenomenon, when a dot array indicated by black points in FIG. 13 is to be written, a dot array indicated by white points is written in the field memory 18. More specifically, although scanning must be originally performed toward the lower right direction in FIG. 13, scanning is actually performed toward the upper right direction in FIG. 13. In this case, the dot array must be read in a correct scanning direction, i.e., in the direction of the black points. A method of reading the black points will be described below.

To read the black points, as in the above correction of the inclination with respect to the sheet surface, interpolation is performed. If a point Q(10) is to be read out, this point can be obtained upon interpolation using peripheral pixels stored in the field memory 18, i.e., four points P(00), P(10), P(01), and P(11). Assuming that the inclination is θ, the distance between the points P(00) and Q(10) is equal to that between the points P(00) and P(10). However, the x-coordinate of the point Q(10) is actually slightly smaller than "1" because of the inclination of θ and given as cosθ. Similarly, the inclination in the y direction is represented by sinθ. Therefore, as for the value of the point Q(10), when the coordinate value of the point P(00) is defined as 0, the x-coordinate is represented by cosθ, and the y-coordinate is represented by sinθ. Similarly, the x-coordinate of a point Q(20) is obtained by adding 2cosθ to the x-coordinate of the point P(00), and the y-coordinate is obtained by adding 2sinθ. Therefore, the x-coordinate can be obtained by accumulating/adding cosθ toward the lower right direction in FIG. 13, and the y-coordinate can be obtained by accumulating/adding sinθ.

When the next line is to be read out, normally, the y-coordinate is incremented by "1". In the inclined state, however, correction must be performed as well. More specifically, when the start point of the 0th line is the point P(00), the start point of the 1st line is a point Q(01) whose y-coordinate is smaller than that of the point P(01), i.e., smaller than "1" because of the inclination. That is, as for the value of the point Q(01), when the coordinate value of the point P(00) is 0, the x-coordinate of the point Q(01) is represented by −sinθ, and the y-coordinate is represented by cosθ. The relationship between the points Q(01) and Q(11) is the same as that between the points P(00) and Q(10). For this reason, the value of the point Q(11) can be obtained by adding cosθ to the x-coordinate of the value of the point Q(01) and sinθ to the y-coordinate of the point Q(01). Subsequently, the x-coordinate can be obtained by accumulating/adding cosθ toward the lower right direction, and the y-coordinate can be obtained by accumulating/adding sinθ.

When such trigonometric function and accumulation/addition are used, a rotation address can be generated. This can be realized by arranging registers as shown in FIG. 14 and the accumulation/addition circuit in the coordinate conversion circuit 32. As shown in FIG. 13, assume that an accumulation/addition coefficient of the x-coordinate in scanning in the x direction is defined as XW, an accumulation/addition coefficient of the y-coordinate is defined as YW, an accumulation/addition coefficient of the x-coordinate in scanning in the y direction is defined as XO, an accumulation/addition coefficient of the y-coordinate is defined as YO, and x- and y-coordinates of the position of the 0th pixel in the first 0th line are respectively defined as XST and YST. In this case, the six coefficients XST=0, YST=0, XW=cosθ, YW=sinθ, XO=−sinθ, and YO=cosθ are set in the respective registers by the CPU 30, thereby generating a rotation address.

The CPU 30 receives inclination information from the inclination sensor 54, blur amount information, luminance variation information, information of a difference in sizes between the markers 210, which is obtained upon marker detection, data array direction information, and information of a distance between the markers. The CPU 30 can detect a magnification, a rotation angle, and an inclination with respect to the dot array in a plane from such data. The CPU 30 also sets these registers for rotation correction to correct the inclination in the plane and correction of the shift in magnification caused due to the inclination of the pen type reading device 62 with respect to the sheet. More specifically, the CPU 30 calculates sinθ and cosθ in accordance with the rotation angle or determines the values of the XW register and the YW register in accordance with the magnification, and supplies the resultant data to the respective registers of the coordinate conversion circuit 32.

The block diagrams of the above embodiment show combinations of the various types of inclination detection method and correction method. However, these methods are not limited to these and can also be selectively or independently applied to the apparatus.

The sequence will be described below with reference to the timing chart in FIG. 15.

The type of distortion, the magnification, and the scanning direction of code information serving as an image read by the CCD 10 are unknown. The scanned information is temporarily stored in the field memory 18, and then a shift amount of the scanning information is calculated with reference to each marker 210. The data stored in the field memory 18 is read out in accordance with the calculated shift amount, and the readout data is sent to the next processing. This is the basic operation in the arrangement of FIG. 1.

Figure 15:
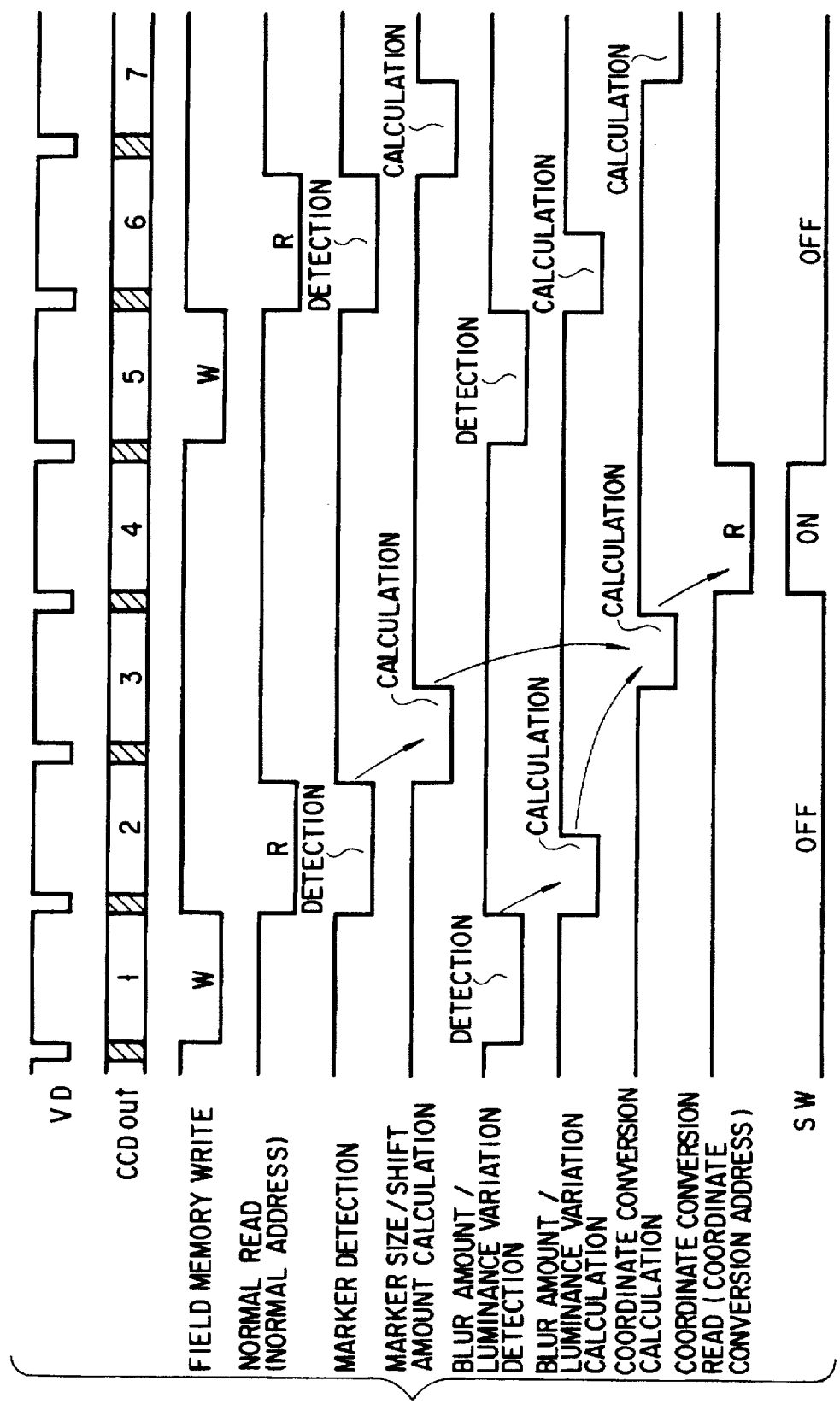
FIG. 15 is a timing chart for explaining the operation sequence of the circuits in FIG. 1.

More specifically, referring to FIG. 15, reference symbol VD denotes a vertical sync signal for each field. The CCD 10 is operated at the same rate as that of the vertical sync signal. Images are output in the first, second, . . . , seventh fields, respectively.

Assume that image data of the first field is written in the field memory 18. In this write mode, an address is generated by the address/coefficient generation circuit 16 to write data from the CCD 10 in the field memory 18 in a one-to-one correspondence. It takes a one-field period to write the image data of the first field.

Upon completion of the write access of the image data, the marker 210 is then detected as the next operation. To detect the marker 210, data is read out from the field memory 18 and binarized to detect the marker 210 for the first time. For this purpose, read access is performed. In this case, binarization is performed to detect the position of the marker 210 while read access to the field memory 18 is being performed. Upon detection of the position of the marker 210, the size and shift of the marker 210 are calculated at the next timing. Note that read access to the field memory 18 is normal read access for reading out data as it is written without performing coordinate conversion. In this normal read mode, since the readout data is not always correct data, this data cannot be transferred to the next data array adjusting section 226. The switch 28 connected to the output of the demodulating circuit 26 is turned off to perform inclination detection or the like. During this period, the demodulated data is inhibited to be sent to the subsequent stage.

When the image signal is output from the CCD 10 and written in the field memory 18, luminance level detection and contrast detection can be simultaneously performed. At this time, the blur amount and luminance variation of the image data written in the field memory 18 are detected. Upon completion of this detection, the respective calculations can be performed in the subsequent stage.

When the blur amount and luminance variation of the image data and the size and shift amount of the marker 210 are calculated, coordinate conversion coefficients are calculated by the CPU 30 on the basis of the calculation results. In the calculation of the coordinate conversion coefficients, the values XW, YW, XO, YO, XST, and YST are calculated. Upon completion of this calculation, actual read access is performed by coordinate conversion. To perform this, the CPU 30 sets the coefficients in the respective coordinate conversion registers. Upon completion of this setting, read access is started. The data is read out at an accurate magnification in the accurate scanning direction in a read access method which allows proper processing, thereby transferring data to the subsequent processing. Since data is transferred for the first time when read access is started using the actually calculated coordinate conversion coefficients, the switch 28 is turned on to send the demodulated data to the next stage.

When processing is performed as described above, it takes a one-field period to write the data in the field memory 18 or to read out the one-field data. Although the marker 210 is detected while the data is read out from the field memory 18, it takes about a ½-period to calculate the position of the marker 210, and it also takes about a ½-period to calculate the coordinate conversion coefficients. Therefore, it takes about a two-field period to write the data in the field memory 18 and then read out the written data. For this reason, when image data of one field is written, this data can be accurately read out three fields after write access of this image data. Since the field memory 18 is read-accessed to transfer the readout data to the next stage, data can be written in the field memory 18 again in the next field. Image data of the fifth field can be written in the field memory 18. In this system, write access and actual read access are performed once every four fields.

The following arrangements can be obtained by the above embodiment of the present invention.

(1) An information reproducing apparatus comprising a reading means for optically reading a code from a recording medium in which multimedia information including at least one of audio information, video information, and digital code data is recorded as the code capable of being optically read, a restoring means for restoring the code read by the reading means into the multimedia information, and an output means for outputting the multimedia information restored by the restoring means is characterized by comprising an inclination detecting means for detecting an inclined state of the reading means with respect to the recording medium.

Although a conventional information reproducing apparatus must scan a code while being held perpendicular or almost perpendicular to a recording medium, an inclination angle of an information reproducing apparatus with respect to the recording medium is detected in the present invention, and this detection result can be utilized for inclination correction. Therefore, a handy information reproducing apparatus can be more conveniently operated.

(2) The apparatus having the arrangement (1) is characterized by comprising a correcting means for correcting an output from the reading means in accordance with the inclined state detected by the inclination detecting means.

Even if the information reproducing apparatus is not set perpendicularly to the recording medium but is inclined with respect thereto and scanned, the multimedia information can always be accurately reproduced. Operations can be performed without paying attention to the posture of the apparatus, thereby improving convenience.

(3) The apparatus having the arrangement (1) is characterized in that the inclination detecting means is an inclination sensor arranged in the reading means.

The inclination can be easily detected without performing complicated image processing.

(4) The apparatus having the arrangement (1) is characterized in that the inclination detecting means is a means for detecting an inclined state on the basis of a luminance distribution of outputs from the reading means.

That is, only average luminance distribution information required for AE (Automatic Exposure) control and AGC control is used to easily perform inclination detection, and he circuit arrangement can also be simplified. A new sensor need not be arranged, which can contribute to a simpler arrangement.

(5) The apparatus having the arrangement (4) is characterized by comprising luminance correcting means for performing luminance correction so that the luminance distribution of the outputs from the reading means becomes a predetermined distribution in accordance with the inclined state detected by the inclination detecting means.

Even if the information reproducing apparatus is not set perpendicularly to the recording medium, but is inclined with respect thereto and scanned, the multimedia information can be accurately reproduced. In addition, all the operations are performed by electrical processing, which then contributes to a compact circuit.

(6) The apparatus having the arrangement (5) is characterized in that the restoring means includes binarizing means for binarizing the output from the reading means, and the correcting means is a threshold setting means for setting a threshold for binarization in the binarizing means on the basis of the luminance distribution.

Although accurate binarization cannot be performed in a conventional case, accurate binarization can be performed, and as a result, accurate multimedia information can be reproduced.

(7) The apparatus having the arrangement (4) is characterized in that one image pickup screen is divided into a plurality of areas for detection.

Although an accurate luminance distribution cannot be conventionally detected in uniform screen detection by a photometric sensor or the like to disable accurate binarization, a more faithful luminance distribution can be detected, and the binarization threshold can be accurately generated.

(8) The apparatus having the arrangement (1) is characterized in that the code has a plurality of blocks each having a plurality of data patterns arranged in accordance with contents of the information and markers arranged in a predetermined positional relationship with the data patterns, and the inclination detecting means is a means for detecting a state of a marker of the code read by the reading means and detecting an inclination of the detected marker state.

That is, the code and the identifiable marker are arranged at a reference position, so that the inclination can be detected in accordance with a marker state in the reproduction mode. In addition, another inclination sensor and the like need not be used, which then contributes to a compact circuit.

(9) The apparatus having the arrangement (8) is characterized in that the inclination detecting means is a means for detecting the inclined state on the basis of a blurred (out-of-focus) state of the pattern.

The inclination of the input device can be easily and electrically detected with a simple arrangement without requiring another sensor.

(10) The apparatus having the arrangement (9) is characterized in that the correcting means is a means for compensating for blur so as to minimize the blur of the pattern.

Thickening and blur of a binarized dot can be eliminated, detection precision for a marker or the like can be improved, and correct multimedia data can be reproduced.

(11) The apparatus having the arrangement (10) is characterized in that the restoring means includes an edge emphasis circuit for emphasizing an edge of the output from the reading means and a binarization circuit for binarizing an edge-emphasized signal, the edge emphasis circuit being partially shared with an MTF compensation circuit for compensating MTFs of an image pickup system in the reading means and a signal processing system.

That is, blur can be compensated by MTF compensation together with the edge emphasis circuit for processing non-binarized data, without adding any circuit, thereby properly reproducing the marker.

(12) The apparatus having the arrangement (9) is characterized in that the means for detecting the inclined state on the basis of the blurred state of the pattern is partially shared with a circuit for detecting the luminance distribution of the outputs from the reading means.

AE and AGC control operations can be performed by a single circuit, thereby simplifying the circuit arrangement and providing a compact circuit as a whole.

(13) The apparatus having the arrangement (8) is characterized in that the inclination detecting means is a means for detecting the inclination on the basis of a positional shift of the marker.

A data array is distorted in the presence of an inclination to disable proper detection of the marker and data in a conventional arrangement. However, the inclination can be easily and accurately detected.

(14) The apparatus having the arrangement (13) is characterized in that the correcting means is a means for translating a read address of the code so as to correct the positional error of the marker.

The dot array can be properly reproduced, and therefore the marker and data can be properly detected and reproduced.

(15) The apparatus having the arrangement (13) is characterized in that the positional shift of the marker is detected on the basis of a distance between adjacent markers.

The marker and data can be properly detected with a small circuit.

(16) The apparatus having the arrangement (8) is characterized in that the inclination detecting means is a means for detecting the inclination on the basis of a size of the marker.

A data array is distorted in the presence of an inclination to disable proper detection of the marker and data in a conventional arrangement. However, the inclination can be easily and accurately detected.

(17) The apparatus having the arrangement (16) is characterized in that the correcting means is a means for translating a read address of the code so as to correct a size of the marker.

The dot array can be properly reproduced, and therefore the marker and data can be properly detected is and reproduced.

(18) The apparatus having the arrangement (16) is characterized in that detection of the size of the marker is performed by calculating an area value.

The dot array can be properly reproduced, and therefore the marker and data can be properly detected and reproduced.

(19) An information reproducing apparatus comprising a reading means for optically reading a code from a recording medium in which multimedia information including at least one of audio information, video information, and digital code data is recorded as the code capable of being optically read, a restoring means for restoring the code read by the reading means into the multimedia information, and an output means for outputting the multimedia information restored by the restoring means is characterized in that the code has a plurality of blocks each having a plurality of data patterns arranged in accordance with contents of the information and markers arranged in a predetermined positional relationship with the data patterns, the restoring means comprises a memory means for storing a code read by the reading means and a memory control means for controlling read access of the code from the memory means, the memory control means controlling to read out the code using a normal address in a first sequence and read out the code using an address changed by coordinate conversion in a second sequence.

When these two sequences are simultaneously performed, the circuit size is undesirably increased. However, the sequences are time-divisionally performed to share the circuits, thereby reducing the circuit size.

(20) The apparatus having the arrangement (19) is characterized by comprising a means for inhibiting data transmission to a subsequent output processing circuit during the first sequence.

Data other than a normal output signal will not be transmitted to the subsequent stage, and data will not be erroneously detected (a strange tone or picture). Only the proper multimedia information can be output.

As has been described above, according to the present invention, there is provided an information reproducing apparatus capable of accurately detecting an inclination even if a reading device for manually reading multimedia information including audio information, video information and digital code data is not scanned perpendicularly or almost perpendicularly to a sheet recorded with a code in which the multimedia information can be optically read, but is scanned at an inclination angle with respect to the sheet.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information reproducing apparatus capable of detecting inclination of a manual scan type handy reading device and correcting adverse effects arising from the inclination, comprising:

reading means for optically reading a two-dimensional code from a reading medium by manual scanning, said two-dimensional code in the reading medium being read as image information, and representing multimedia information including at least one of audio information, video information and digital code data;

inclination detecting means for detecting an inclined state of said reading means with respect to the recording medium, said inclination detecting means detecting the inclined state of the reading means on the basis of the image information corresponding to the two-dimensional code read by the reading means;

restoring means for restoring the two-dimensional code read by said reading means into the multimedia information responsive to said inclination detecting means; and output means for outputting the multimedia information restored by said restoring means.

2. An apparatus according to claim 1, wherein said restoring means comprises correcting means for correcting the image information read by said reading means in accordance with the inclined state detected by said inclination detecting means.

3. An apparatus according to claim 1, wherein said inclination detecting means includes means for detecting said inclined state on the basis of a luminance distribution in the image information read by said reading means.

4. An apparatus according to claim 3, further comprising luminance correcting means for performing luminance correction so that the luminance distribution in the image information read by said reading means becomes a predetermined distribution in accordance with the inclined state detected by said inclination detecting means.

5. An apparatus according to claim 4, wherein said restoring means includes binarizing means for binarizing the image information read by said reading means, and said correcting means includes threshold setting means for setting a threshold for binarization in said binarizing means on the basis of the luminance distribution.

6. An apparatus according to claim 3, wherein one image pickup screen involved in the image information read by the reading means is divided into a plurality of areas for detection.

7. An apparatus according to claim 1, wherein the code has a plurality of blocks each having a plurality of data patterns arranged in accordance with contents of the information and markers arranged in a predetermined positional relationship with the data patterns, and said inclination detecting means includes means for detecting a state of said markers of the code involved in the image information read by said reading means and detecting an inclination of the detected marker state.

8. An apparatus according to claim 7, wherein said inclination detecting means includes means for detecting the inclined state on the basis of a blurred state of the markers involved in the image information read by the reading means.

9. An apparatus according to claim 8, wherein said restoring means includes correction means for compensating for blur so as to minimize the blur of the markers.

10. An apparatus according to claim 9, wherein said restoring means includes an edge emphasis circuit for emphasizing an edge of the image information read by said reading means and a binarization circuit for binarizing an edge-emphasized signal, said edge emphasis circuit being partially shared with an MTF compensation circuit for compensating MTFs of an image pickup system in said reading means and a signal processing system, when the blur is compensated for.

11. An apparatus according to claim 8, wherein said means for detecting the inclined state on the basis of the blurred state of the pattern is partially shared with a circuit for detecting the luminance distribution in the image information read by said reading means.

12. An apparatus according to claim 7, wherein said inclination detecting means includes means for detecting the inclination on the basis of a positional shift of the markers involved in the image information read by the reading means.

13. An apparatus according to claim 12, wherein said correcting means includes a memory for storing the code read by the reading means, and correction means for translating a read address of the image information stored in the memory so as to correct the positional error of the markers.

14. An apparatus according to claim 12, wherein the positional shift of the marker is detected on the basis of a distance between adjacent markers.

15. An apparatus according to claim 7, wherein said inclination detecting means includes means for detecting the inclination on the basis of a size of the markers involved in the image information read by the reading means.

16. An apparatus according to claim 15, wherein said restoring means includes a memory for storing coded image information read by the reading means, and correction means for translating a read address of the image information stored in the memory so as to correct a size at least one of the markers.

17. An apparatus according to claim 15 wherein detection of the size of the marker is performed by calculating an area value.

* * * * *